United States Patent
Darty et al.

(10) Patent No.: US 10,900,835 B2
(45) Date of Patent: Jan. 26, 2021

(54) HYPERSPECTRAL IMAGING METHOD AND DEVICE

(71) Applicant: Hypermed Imaging, Inc., Memphis, TN (US)

(72) Inventors: Mark Anthony Darty, Collierville, TN (US); Peter Martin Meenen, Cane Ridge, TN (US)

(73) Assignee: HYPERMED IMAGING, INC., Memphis, TN (US)

( * ) Notice: Subject to any disclaimer, the term of this patent is extended or adjusted under 35 U.S.C. 154(b) by 0 days.

(21) Appl. No.: 16/569,375

(22) Filed: Sep. 12, 2019

(65) Prior Publication Data
US 2020/0088580 A1 Mar. 19, 2020

Related U.S. Application Data

(60) Provisional application No. 62/730,887, filed on Sep. 13, 2018.

(51) Int. Cl.
*G01J 3/28* (2006.01)
*G01J 3/02* (2006.01)

(52) U.S. Cl.
CPC ............ *G01J 3/2823* (2013.01); *G01J 3/2803* (2013.01); *G01J 3/0208* (2013.01); *G01J 2003/2866* (2013.01)

(58) Field of Classification Search
CPC ...... G01J 3/2823; G01J 3/2803; G01J 3/0208; G01J 2003/2866
See application file for complete search history.

(56) References Cited

U.S. PATENT DOCUMENTS

| | | | |
|---|---|---|---|
| 6,081,612 A | 6/2000 | Gutkowicz-Krusin et al. | |
| 9,526,427 B2 | 12/2016 | Darty et al. | |
| 9,619,883 B2 | 4/2017 | Yudovsky | |
| 9,648,254 B2 | 5/2017 | Darty et al. | |
| 2010/0069758 A1 | 3/2010 | Barnes et al. | |
| 2014/0257113 A1* | 9/2014 | Panasyuk ............. | A61B 5/0075 600/476 |
| 2015/0265150 A1 | 9/2015 | Darty et al. | |
| 2015/0265195 A1 | 9/2015 | Darty et al. | |

OTHER PUBLICATIONS

Akbari, H., et al., Conf Proc IEEE Eng Med Biol Soc. 2008:1238-41.
Akbari, H., et al., Conf Proc IEEE Eng Med Biol Soc. 2009:1461-4.
(Continued)

*Primary Examiner* — Jamil Ahmed
(74) *Attorney, Agent, or Firm* — Brett A. Lovejoy; Andrew J. Antczak; Morgan, Lewis & Bockius LLP

(57) ABSTRACT

Disclosed are hyperspectral/multiple spectral imaging methods and devices. A method obtains first and second spectral image datasets of a region of interest (ROI). The first spectral image dataset is characterized by a first spectral range and the second spectral image dataset is characterized by a second spectral range. The method then performs a first spectral analysis on the first spectral image dataset and a second spectral analysis on the second spectral image dataset. Afterwards, the method determines one or more spectral signature(s) at a deeper layer of the ROI.

20 Claims, 13 Drawing Sheets

(56) References Cited

OTHER PUBLICATIONS

Akbari, H., et al., IEEE Trans Biomed Eng. Aug. 2010; 57(8):2011.
Chin, M.S., et al., J Biomed Opt. Feb. 2012; 17(2):026010.
Chang, S.K., et al., Clin Cancer Res. Jul. 1, 2008 1;14(13):4146-53.
Ferris, D.G., et al., J Low Genit Tract Dis. Apr. 2001; 5(2):65-72.
Findlay, G.H., "Blue Skin," British Journal of Dermatology 83(1), 127-134 (1970).
Gibbs-Strauss, S.L., et al., Mol Imaging. Apr. 2011; 10(2):91-101.
Gillies, R., et al., and Diabetes Technol Ther. 2003;5(5):847-55.
Greenman, R.L., et al., Lancet. Nov. 12, 2005;366(9498):1711-7.
Holzer, M.S., et al., J Urol. Aug. 2011; 186(2):400-4.
Jafari-Saraf, and Gordon, Ann Vasc Surg. Aug. 2010; 24(6):741-6.
Khaodhiar, L. et al., Diabetes Care 2007;30:903-910.
Liu, Z., et al., Appl Opt. Dec. 1, 2007;46(34):8328-34.
Liu, Z., et al., Sensors (Basel). 2012; 12(1):162-74.
Palmer, G.M., et al., J Biomed Opt. Nov.-Dec. 2010; 15(6):066021.
Panasyuk, S.V., et al., Cancer Biol Ther. Mar. 2007; 6(3):439-46.
Siddiqi, A.M., et al., Cancer. Feb. 25, 2008;114(1):13-21.
Sorg, B.S., et al., J Biomed Opt. Jul.-Aug. 2005; 10(4):44004.
Uhr, J.W., et al., Transl Res. May 2012; 159(5):366-75.
Zhi, L., et al., Comput Med Imaging Graph. Dec. 2007; 31(8):672-8.
Zuzak, K.J., et al., Anal Chem. May 1, 2002;74(9):2021-8.
Zuzak, K.J., et al., Anal Chem. Oct. 1, 2011;83(19):7424-30.
Page 2854 of Capinera J.L., Encyclopedia of Entomology, 2nd Edition, Springer Science (2008).

\* cited by examiner

HYPERSPECTRAL IMAGING METHOD AND DEVICE

CROSS-REFERENCE TO RELATED APPLICATIONS

The present application claims priority to U.S. provisional Application No. 62/730,887, filed on Sep. 13, 2018, the disclosure of which is hereby incorporated herein by reference, in its entirety, for all purposes.

TECHNICAL FIELD

The present disclosure relates to hyperspectral spectroscopy, and more particularly, to hyperspectral imaging devices and methods capable of providing more accurate and useful information.

BACKGROUND

Hyperspectral (also known as "multispectral") spectroscopy is an imaging technique that integrates multiple images of an object resolved at different spectral bands (e.g., ranges of wavelengths) into a single data structure, referred to as a three-dimensional hyperspectral data cube. Hyperspectral spectroscopy is often used to identify an individual component of a complex composition through the recognition of corresponding spectral signatures of the individual components in a particular hyperspectral data cube.

Hyperspectral spectroscopy has been used in a variety of applications, ranging from geological and agricultural surveying to military surveillance and industrial evaluation. Hyperspectral spectroscopy has also been used in medical applications to facilitate complex diagnosis and predict treatment outcomes. For example, medical hyperspectral imaging has been used to determine tissue oxygenation. Adequate tissue oxygenation is vital for restoration of tissue function and integrity. In wound healing, adequate tissue oxygenation can trigger healing responses and favorably influence the outcomes of other treatment modalities.

Currently, there are two primary approaches using medical hyperspectral imaging to determine tissue oxygenation. Both of them have some drawbacks. The first approach employs only visible light (e.g., 450 nm to 700 nm wavelengths) to determine the oxygen content of the tissue in the outer surface layer of the tissue (e.g., 1-4 mm in depth). In this approach, the absorption by melanin is strong and must be countered when computing the oxygen content. As such, it requires more complex algorithms and greater computing power. In some cases, the absorption by melanin is so strong that it is difficult to get reliable signals in some wavelength bands without the use of bright illumination or longer camera exposures.

The second approach uses near infrared light (e.g., 700 nm to 1000 nm wavelengths) to image the tissue. Near infrared light generally penetrates deeper into the tissue (e.g., 1-10 mm in depth). As a result, the oxygen content obtained at this range includes not only the oxygen content at the outer surface layer of the tissue but also the oxygen content at the deeper layer of the tissue. This deeper tissue tends to be impacted more by the blood in the veins and arteries and less by that present in the capillary bed. As such, the second approach provides more of a picture of arterial supply and venous sufficiency and less of a picture of the actual delivery of oxygenated blood to the surface tissue as would be needed to assess wound healing.

Given the current state of the art, there remains a need for systems, methods and devices that address the abovementioned issues.

The information disclosed in this Background section is provided for an understanding of the general background of the invention and is not an acknowledgement or suggestion that this information forms part of the prior art already known to a person skilled in the art.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect of the present disclosure provides an imaging method for providing medical information of a region of interest (ROI) of a subject. The imaging method is to be performed by a device comprising a processor and memory. The imaging method comprises obtaining first and second spectral image datasets of the ROI. The first spectral image dataset comprises a first plurality of signal arrays. Each respective signal array in the first plurality of signal arrays is characterized by a single corresponding spectral band in a first plurality of spectral bands, wherein each spectral band in the first plurality of spectral bands is within a first spectral range. The second spectral image dataset comprises a second plurality of signal arrays. Each respective signal array in the second plurality of signal arrays is characterized by a single corresponding spectral band in a second plurality of spectral bands, wherein each spectral band in the second plurality of spectral bands is within a second spectral range that is different than the first spectral range. The imaging method also comprises performing first and second spectral analyses. The first spectral analysis is performed on the first spectral image dataset to determine first concentration values of each spectral signature in a first spectral signature set at each respective point in an array of points corresponding to a two-dimensional area of the ROI. The first spectral signature set comprises a first spectral signature. The second spectral analysis is performed on the second spectral image dataset to determine second concentration values of each spectral signature in a second spectral signature set at each respective point in the array of points. The second spectral signature set also comprises the first spectral signature. The imaging method further comprises generating third concentration values of each spectral signature in a third spectral signature set at each respective point in the array of points. The third spectral signature set comprises the first spectral signature. The third concentration values of the first spectral signature are generated by compensating the second concentration values of the first spectral signature with the first concentration values of the first spectral signature at each respective point in the array of points.

In an embodiment, the first and second spectral image datasets of the ROI are obtained by obtaining a spectral image dataset that comprises the first and second spectral image datasets.

In an embodiment, the third concentration values of the first spectral signature are calculated based on the first and second concentration values of the first spectral signature at each respective point in the array of points.

In an embodiment, the third concentration values of the first spectral signature are generated by subtracting the first concentration values of the first spectral signature from the second concentration values of the first spectral signature at each respective point in the array of points.

In an embodiment, the first spectral signature is one of oxyhemoglobin and deoxyhemoglobin.

In some embodiments, each of the first, second and third signature sets comprises a second spectral signature. The third concentration values of the second spectral signature at each respective point in the array of points are generated by compensating the second concentration values of the second spectral signature with the first concentration values of the second spectral signature at each respective point in the array of points.

In an embodiment, the third concentration values of the second spectral signature are generated by subtracting the first concentration values of the second spectral signature from the second concentration values of the second spectral signature at each respective point in the array of points.

In an embodiment, the first spectral signature is one of oxyhemoglobin and deoxyhemoglobin, and the second spectral signature is the other of oxyhemoglobin and deoxyhemoglobin.

In some embodiments, the second spectral signature set further comprises a third spectral signature. In an embodiment, the third spectral signature is water present in the ROI.

In some embodiments, at least one of the first, second and third spectral signature sets further comprises a fourth spectral signature. In an embodiment, the fourth spectral signature is melanin present in the ROI.

In many embodiments, the performing of the first spectral analysis on the first spectral image dataset comprises determining, using the first spectral image dataset, first absorption values at each respective point in the array of points and at each single spectral band in at least a subset of the first plurality of spectral bands. The first concentration values of each spectral signature in the first spectral signature set at each respective point in the array of points are determined based on the first absorption values.

In some embodiment, the determining of the first absorption values comprises determining, using the first spectral image dataset, first initial absorption values at each respective point in the array of points and at each single spectral band in at least the subset of the first plurality of spectral bands. The determining of the first absorption values also comprises obtaining correction values at each respective point in the array of points and at each single spectral band in at least the subset of the first plurality of spectral bands. The determining of the first absorption values further comprises generating the first absorption values by compensating the first initial absorption values with the correction values at each respective point in the array of points and at each single spectral band in at least the subset of the first plurality of spectral bands.

In an embodiment, the correction values are absorption values of a predetermined spectral signature and the generating of the first absorption values is performed by subtracting the absorption values of the predetermined spectral signature from the first initial absorption values at each respective point in the array of points and at each single spectral band in at least the subset of the first plurality of spectral bands.

In many embodiments, the performing of the second spectral analysis on the second spectral image dataset comprises determining, using the second spectral image dataset, second absorption values of each spectral signature in the second spectral signature set at each respective point in the array of points and at each single spectral band in at least a subset of the second plurality of spectral bands. The second concentration values of each spectral signature in the second spectral signature set at each respective point in the array of points are determined based on the second absorption values.

In some embodiments, the determining of the second absorption values comprises determining, using the second spectral image dataset, second initial absorption values at each respective point in the array of points and at each single spectral band in at least the subset of the second plurality of spectral bands. The determining of the second absorption values also comprises obtaining correction values at each respective point in the array of points and at each single spectral band in at least the subset of the second plurality of spectral bands. The determining of the second absorption values further comprises generating the second absorption values by compensating the second initial absorption values with the correction values at each respective point in the array of points and at each single spectral band in at least the subset of the second plurality of spectral bands.

In an embodiment, the correction values are absorption values of a predetermined spectral signature and the generating of the first absorption values is performed by subtracting the absorption values of the predetermined spectral signature from the first initial absorption values at each respective point in the array of points and at each single spectral band in at least the subset of the first plurality of spectral bands.

In some embodiments, the correction values are absorption values of melanin present in the ROI.

In some embodiments, the correction values are absorption values of water present in the ROI.

In some embodiments, the imaging method further comprises pre-processing, prior to the performing of the first spectral analysis, the first spectral image dataset, wherein the pre-processing of the first spectral image dataset comprises one or more of blurring, noise filtering, sharpening, edge recognition, contrast enhancement and segmentation.

In some embodiments, the imaging method further comprises pre-processing, prior to the performing of the second spectral analysis, the second spectral image dataset, wherein the pre-processing of the second spectral image dataset comprises one or more of blurring, noise filtering, sharpening, edge recognition, contrast enhancement and segmentation.

In some embodiments, the imaging method further comprises capturing a first spectral image of the ROI to provide the first spectral image dataset of the ROI, and/or capturing a second spectral image of the ROI to provide the second spectral image dataset of the ROI.

In an embodiment where the device further comprises a first photo-sensor and/or a second photo-sensor configured to resolve light, the imaging method further comprises (i) exposing the first photo-sensor to a first light beam to generate the first plurality of signal arrays, and/or (ii) exposing the second photo-sensor to a second light beam to generate the second plurality of signal arrays. The first light beam is substantially limited to the first plurality of spectral bands. The second light beam is substantially limited to the second plurality of spectral bands. The exposure of the first photo-sensor to the first light beam and the exposure of the second photo-sensor to the second light beam are performed independently from each other, subsequently from each other, or substantially concurrently with each other.

In an embodiment where the device further comprises first and second light sources configured to provide illumination light, the imaging method further comprises firing the first light source and the second light source independently from each other, subsequently from each other, or substantially concurrently with each other.

In some embodiments, the imaging method further comprises capturing a spectral image of the ROI to provide both of the first and second spectral image datasets of the ROI.

In an embodiment wherein the device further comprises a photo-sensor configured to resolve light, the imaging method further comprises exposing the photo-sensor to a light beam to generate the first plurality of signal arrays and the second plurality of signal arrays.

In an embodiment, the imaging method further comprises constructing a visual image dataset for displaying as a visual image of the ROI of the subject. The visual image dataset is constructed by concatenating three spectral planes from the first spectral dataset, the second spectral dataset or both.

In some embodiments, the imaging method further comprises constructing a composite image dataset by combining at least a subset of the first spectral image dataset with at least a subset of the second spectral image dataset, or by combining at least a subset of the first concentration values of one or more spectral signatures in the first spectral set and at least a subset of the third concentration values of one or more spectral signatures in the third spectral set. Selection of the at least a subset of the first spectral image dataset and the at least a subset of the second spectral image dataset are based on spatial, spectral, or both spatial and spectral consideration. Selection of the at least a subset of the first concentration values and the at least a subset of the third concentration values are based on spatial, spectral, or both spatial and spectral consideration.

In some embodiments, the imaging method further comprises displaying, as a map or a contour on the ROI of the subject or on a display in electrical communication with the processor, one or more of: (i) the first concentration values of a particular spectral signature in the first spectral signature set; (ii) the second concentration values of a particular spectral signature in the second spectral signature set; (iii) the third concentration values of a particular spectral signature in the third spectral signature set; (iv) index values derived from the first, second or third concentration values of one or more spectral signatures; and (v) one or more composite image datasets, each constructed by combining at least a subset of the first spectral image dataset with at least a subset of the second spectral image dataset, or by combining at least a subset of the first concentration values of one or more spectral signatures in the first spectral set and at least a subset of the third concentration values of one or more spectral signatures in the third spectral set.

In an embodiment, spatially-varying concentration or index values are represented by different colors or by spatially-varying intensity of one or more colors.

In some embodiments, the imaging method further comprises providing medical information of the ROI based on one or more of: (i) the first concentration values of one or more spectral signatures in the first spectral signature set; (ii) the second concentration values of one or more spectral signatures in the second spectral signature set; (iii) the third concentration values of one or more spectral signatures in the third spectral signature set; (iv) index values derived from the first, second or third concentration values of one or more spectral signatures; and (v) one or more composite image datasets, each constructed by combining at least a subset of the first spectral image dataset with at least a subset of the second spectral image dataset, or by combining at least a subset of the first concentration values of one or more spectral signatures in the first spectral set and at least a subset of the third concentration values of one or more spectral signatures in the third spectral set.

In some embodiments, the imaging method further comprises communicating with an external device or communication network to transmit and/or receive data between the device and the external device or the communication network.

In some embodiments, the first spectral range has a spectral range between 450 nm and 700 nm, and the second spectral range has a spectral range between 700 nm and 1300 nm. In an embodiment, the second spectral range has a spectral range between 700 nm and 1000 nm.

In some embodiments, the first plurality of spectral bands comprises four to twenty, four to sixteen, or eight to sixteen spectral bands. In an embodiment, the first plurality of spectral bands comprises spectral bands having central wavelengths of: 520±3 nm, 540±3 nm, 560±3 nm, 580±3 nm, 590±3 nm, 610±3 nm, 620±3 nm, and 660±3 nm, wherein each spectral band in the first plurality of spectral bands has a full width at half maximum of less than 20 nm, less than 15 nm, or less than 10 nm.

In some embodiments, the second plurality of spectral bands comprises four to sixteen spectral bands, four to twelve spectral bands, or four to eight spectral bands. In an embodiment, the second plurality of spectral bands comprises spectral bands having central wavelengths of: 740±3 nm, 760±3 nm, 850±3 nm, 860±3 nm, 880±3 nm, and 940±3 nm, wherein each spectral band in the second plurality of spectral bands has a full width at half maximum of less than 20 nm, less than 15 nm, or less than 10 nm. In an embodiment, the second plurality of spectral bands further comprises a spectral band having a central wavelength of 830±3 nm or 835±3 nm with a full width at half maximum of less than 20 nm, less than 15 nm, or less than 10 nm.

Another aspect of the present disclosure provides an imaging method for providing medical information of a region of interest (ROI) of a subject. The imaging method is to be performed by a device comprising a processor and memory. The imaging method obtains a spectral image dataset of the ROI that comprises a plurality of signal arrays. Each respective signal array in the plurality of signal arrays is characterized by a single corresponding spectral band in a plurality of spectral bands. The imaging method calculates, using the spectral image dataset, initial absorption values at each respective point in an array of points corresponding to a two-dimensional area of the ROI and at each single spectral band in at least a subset of the plurality of spectral bands. The imaging method obtains correction values at each respective point in the array of points and at each single spectral band in at least the subset of the plurality of spectral bands. The imaging method then compensates the initial absorption values with the correction values at each respective point in the array of points and at each single spectral band in at least the subset of the plurality of spectral bands, thereby producing corrected absorption values at each respective point in the array of points and at each single spectral band in at least the subset of the plurality of spectral bands. Afterwards, the imaging method determines, using the corrected absorption values at each respective point in the array of points and at each single spectral band in at least the subset of the plurality of spectral bands, concentration values of one or more spectral signatures at each respective point in the array of points.

In an embodiment, each spectral band in the plurality of spectral bands is between 450 nm and 700 nm, or between 450 nm and 1000 nm the spectral range is between 450 nm and 700 nm.

In an embodiment, each single spectral band in at least the subset of the plurality of spectral bands is between 450 nm and 700 nm.

In an embodiment, the correction values are absorption values of a predetermined spectral signature and the corrected absorption values are produced by subtracting the absorption values of the predetermined spectral signature from the initial absorption values at each respective point in the array of points and at each single spectral band in at least the subset of the plurality of spectral bands.

A further aspect of the present disclosure provides an imaging device for providing medical information of a region of interest (ROI) of a subject. The imaging device comprises an imaging unit and a control module. The imaging unit is configured to receive light from the ROI of the subject, and generate a spectral image dataset of the ROI. The spectral image dataset comprises first and second image datasets of the ROI. The first and second image datasets of the ROI can be any of the first and second image datasets of the ROI disclosed herein. The control module is in electrical communication with the imaging unit to receive the first and second spectral image datasets of the ROI from the imaging unit. The control module is configured to perform one or more steps disclosed herein. For instance, the control module is configured to perform the first and second spectral analysis and to generate third concentration values of each spectral signature in a third spectral signature set at each respective point in the array of points.

In many embodiments, the imaging unit comprises a lens assembly, a spectral filter unit and a photo-sensor unit. The lens assembly is configured to receive the light from the ROI of the subject. The spectral filter unit is in optical communication with the lens assembly and configured to filter the light. The spectral filter unit is characterized by the first and second pluralities of spectral bands. The photo-sensor unit in optical communication with the spectral filter unit and configured to resolve the filtered light to the first spectral image dataset and the second spectral image dataset. The first spectral image dataset corresponds to the first plurality of spectral bands and the second spectral image dataset corresponds to the second plurality of spectral bands.

In some embodiments, the spectral filter unit comprises a single filter having an array of filter elements. Each filter element in the array of filter elements is one of a first plurality of filter-types or one of a second plurality of filter-types. Each respective filter-type in the first plurality of filter types is characterized by a corresponding single spectral band that is characterized by (i) being one of the first plurality of spectral bands, (ii) being different from the other filter-types in the first plurality of filter types, and (iii) having a full width at half maximum of less than 20 nm. Each respective filter-type in the second plurality of filter types is characterized by a corresponding single spectral band that is characterized by (i) being one of the second plurality of spectral bands, (ii) being different from the other filter-types in the second plurality of filter types, and (iii) having a full width at half maximum of less than 20 nm. The photo-sensor unit comprises a single photo-sensor having an array of photo-sensor elements to receive light filtered by the single filter, thereby generating an array of photo-sensor outputs. The control module is configured to construct the first spectral image dataset by selecting a first subset of the array of photo-sensor outputs that are associated with the first plurality of filter types, and construct the second spectral image dataset by selecting a second subset of the array of photo-sensor outputs that are associated with the second plurality of filter types.

In an embodiment, filter elements of at least one particular filter-type in the first plurality of filter-types are spatially distributed across throughout the single spectral filter, and filter elements of at least one particular filter-type in the second plurality of filter-types are spatially distributed across throughout the single spectral filter.

In some embodiments, the imaging unit further comprises a dichroic optics in optical communication with the lens assembly and configured to split the light from the lens assembly into a first light beam and a second light beam. The spectral filter unit comprises a first spectral filter and a second spectral filter. The first spectral filter is in optical communication with the dichroic optics and comprises a first array of filter elements configured to filter the first light beam. The second spectral filter is in optical communication with the dichroic optics and comprises a second array of filter elements configured to filter the second light beam. Each filter element in the first array of filter elements is one of a first plurality of filter-types or one of a second plurality of filter-types. Each filter element in the second array of filter elements is another one of the first plurality of filter-types or another one of the second plurality of filter-types that is different from the one of the first or second plurality of filter-types. Each respective filter-type in the first plurality of filter types is characterized by a corresponding single spectral band that is characterized by (i) being one of the first plurality of spectral bands, (ii) being different from the other filter-types in the first plurality of filter types, and (iii) having a full width at half maximum of less than 20 nm. Each respective filter-type in the second plurality of filter types is characterized by a corresponding single spectral band that is characterized by (i) being one of the second plurality of spectral bands, (ii) being different from the other filter-types in the second plurality of filter types, and (iii) having a full width at half maximum of less than 20 nm. The photo-sensor unit comprises a first photo-sensor and a second photo-sensor. The first photo-sensor is in optical communication with the first spectral filter and comprises a first array of photo-sensor elements configured to resolve light filtered by the first spectral filter, thereby generating a first array of photo-sensor outputs. The second photo-sensor is in optical communication with the second spectral filter and comprises a second array of photo-sensor elements configured to resolve light filtered by the second spectral filter, thereby generating a second array of photo-sensor outputs. The control module is configured to construct the first spectral image dataset by selecting a first subset of the first array of photo-sensor outputs and a first subset of the second array of photo-sensor outputs generated by resolving light filtered by the first plurality of filter types; and construct the second spectral image dataset by selecting a second subset of the first array of photo-sensor outputs and a second subset of the second array of photo-sensor outputs generated by resolving light filtered by the second plurality of filter types.

In an embodiment, the dichroic optics is a dichroic mirror or a dichroic splitter that reflects one of the first and second light beams and passes the other of the first and second light beams.

In an embodiment, each filter element in the first array of filter elements is one of the first plurality of filter-types, and each filter element in the second array of filter elements is one of the second plurality of filter-types. In such an embodiment, the first spectral image dataset is constructed from the first array of photo-sensor outputs and the second spectral image dataset is constructed from the second array of photo-sensor outputs.

In an embodiment, at least filter elements of one particular filter-type in the first plurality of filter-types are spatially distributed across throughout the first spectral filter, and at least filter elements of one particular filter-type in the second plurality of filter-types are spatially distributed across throughout the second spectral filter.

In some embodiments, the imaging unit further comprises an optic splitter assembly in optical communication with the lens assembly. The optic splitter assembly comprises a plurality of splitters and is configured to split the light from the lens assembly into a plurality of light beams. The spectral filter unit comprises a plurality of spectral filters. Each respective filter in the plurality of spectral filters comprising an array of filter elements configured to filter a corresponding light beam in the plurality of light beams. Each filter element in the array of filter elements of each respective filter in the plurality of spectral filters is one of a first plurality of filter-types or one of a second plurality of filter-types. Each respective filter-type in the first plurality of filter types is characterized by a corresponding single spectral band that is characterized by (i) being one of the first plurality of spectral bands, (ii) being different from the other filter-types in the first plurality of filter types, and (iii) having a full width at half maximum of less than 20 nm. Each respective filter-type in the second plurality of filter types is characterized by a corresponding single spectral band that is characterized by (i) being one of the second plurality of spectral bands, (ii) being different from the other filter-types in the second plurality of filter types, and (iii) having a full width at half maximum of less than 20 nm. The photo-sensor unit comprises a plurality of photo-sensors. Each respective photo-sensor in the plurality of photo-sensors comprises an array of photo-sensor elements configured to resolve light filtered by a corresponding spectral filter in the plurality of spectral filters, thereby generating an array of photo-sensor outputs. The control module is configured to construct the first spectral image dataset by selecting a first subset of the array of photo-sensor outputs from each photo-sensor in the plurality of photo-sensors that are generated by resolving light filtered by the first plurality of filter types; and construct the second spectral image dataset by selecting a second subset of the array of photo-sensor outputs from each photo-sensor in the plurality of photo-sensors that are generated by resolving light filtered by the second plurality of filter types.

In an embodiment, at least one spectral filter in the plurality of spectral filters is a dual bandpass filter. In an embodiment, at least one spectral filter in the plurality of spectral filters is a multiple bandpass filter.

In some embodiments, the imaging device further comprises a housing having an exterior and an interior. The lens assembly is attached to or within the housing. The spectral filter unit and the photo-sensor unit are disposed in the interior of the housing. In an embodiment, the control module is attached to or within the housing.

In some embodiments, the imaging device further comprises an illumination assembly disposed on the exterior of the housing to emit light in the first and second spectral ranges.

In some embodiments, the illumination assembly comprises one or more incandescent lights, one or more xenon lamps, one or more halogen lamps, one or more hydrargyrum medium-arc iodide, and one or more broadband light emitting diodes (LEDs), or any combination thereof.

In an embodiment, the illumination assembly comprises a plurality of light sources radially disposed on the exterior of the housing about the lens assembly.

In an embodiment, the illumination assembly comprises a first light source emitting light that is substantially limited to the first spectral range and a second light source emitting light that is substantially limited to the second spectral range.

In an embodiment, the illumination assembly comprises a plurality of light source sets radially disposed on the exterior of the housing about the lens assembly. Each light source set in the plurality of light source sets comprises a first light source that emits light that is substantially limited to the first spectral range and a second light source that emits light that is substantially limited to the second spectral range. Each light source in each light source set in the plurality of light source sets is offset from the lens assembly and positioned so that light from each respective light source is backscattered by the ROI of the subject and then passed through the lens assembly. Each light in each light source set has a different radial position with respect to the lens assembly.

In some embodiments, the control module is further configured to: fire the first light source and the second light source independently from each other, subsequently from each other, or concurrently with each other; and generate the first and second spectral image datasets independently from each other, subsequently from each other, or concurrently with each other by controlling the exposure of the spectral filter unit and the photo-sensor unit to light.

In some embodiments, the imaging device further comprises at least one first polarizer disposed in front of the illumination assembly and configured to selectively allow light that is substantially limited to at least one first polarization to pass through; and at least one second polarizer disposed in front of the lens assembly and configured to selectively allow light that is substantially limited to at least one second polarization to pass through. Each polarization in the at least one first polarization is in a different direction from the at least one second polarization, and each polarization in the at least one second polarization is in a different direction from the at least one first polarization.

In an embodiment, a polarization in the at least one first polarization is substantially perpendicular to a polarization in the at least second polarization.

In an embodiment, the control module is further configured to construct a visual image dataset for displaying as a visual image of the ROI of the subject by concatenating three spectral planes from the first spectral dataset, the second spectral dataset or both.

In an embodiment, the control module is further configured to construct a composite image dataset by combining at least a subset of the first spectral image dataset with at least a subset of the second spectral image dataset, or by combining at least a subset of the first concentration values of one or more spectral signatures in the first spectral set and at least a subset of the third concentration values of one or more spectral signatures in the third spectral set.

In some embodiments, the imaging device further comprises a display for displaying one or more of: (i) the first concentration values of a particular spectral signature in the first spectral signature set; (ii) the second concentration values of a particular spectral signature in the second spectral signature set; (iii) the third concentration values of a particular spectral signature in the third spectral signature set; (iv) index values derived from the first, second or third concentration values of one or more spectral signatures; and (v) one or more composite image datasets, each constructed by combining at least a subset of the first spectral image dataset with at least a subset of the second spectral image dataset, or by combining at least a subset of the first concentration values of one or more spectral signatures in the first spectral set and at least a subset of the third concentration values of one or more spectral signatures in the third spectral set.

In an embodiment, the imaging device further comprises a communication interface module in wired or wireless communication with an external device or communication network.

Another further aspect of the present disclosure provides an imaging device for providing medical information of a region of interest (ROI) of a subject. The imaging device comprises a lens assembly, a dichroic optics, first and second spectral filters, and first and second photo-sensors. The lens assembly is configured to receive light from a region of interest (ROI) of a subject. The dichroic optics is in optical communication with the lens assembly, and configured to split the light from the lens assembly into a first light beam and a second light beam. The first and second spectral filters are in optical communication with the dichroic optics.

Yet another further aspect of present disclosure provides an imaging device for providing medical information of a region of interest (ROI) of a subject. The imaging device comprises a lens assembly, a dichroic optics, a lens assembly, first and second spectral filters, and first and second photo-sensors. The dichroic optics is configured to split light from a region of interest (ROI) of a subject into a first light beam and a second light beam. The lens assembly is in optical communication with the dichroic optics and comprises a first lens and a second lens, wherein the first lens is configured to receive the first light beam and the second lens is configured to receive the second light beam. The first spectral filter is in optical communication with the first lens and the second spectral filter is in optical communication with the second lens of the lens assembly.

The first spectral filter comprises a first array of filter elements configured to filter the first light beam. The second spectral filter comprises a second array of filter elements configured to filter the second light beam. Each filter element in the first array of filter elements is one of a first plurality of filter-types or one of a second plurality of filter-types. Each filter element in the second array of filter elements is another one of the first plurality of filter-types or another one of the second plurality of filter-types that is different from the one of the first or second plurality of filter-types. Each respective filter-type in the first plurality of filter types is characterized by a corresponding single spectral band that is characterized by (i) being one of the first plurality of spectral bands, (ii) being different from the other filter-types in the first plurality of filter types, and (iii) having a full width at half maximum of less than 20 nm. Each respective filter-type in the second plurality of filter types is characterized by a corresponding single spectral band that is characterized by (i) being one of the second plurality of spectral bands, (ii) being different from the other filter-types in the second plurality of filter types, and (iii) having a full width at half maximum of less than 20 nm. The first photo-sensor is in optical communication with the first spectral filter and comprises a first array of photo-sensor elements configured to resolve light filtered by the first spectral filter, thereby generating a first array of photo-sensor outputs. The second photo-sensor is in optical communication with the second spectral filter and comprises a second array of photo-sensor elements configured to resolve light filtered by the second spectral filter, thereby generating a second array of photo-sensor outputs.

In some embodiments, the imaging devices further comprises a control module in electrical communication with the first photo-sensor and the second photo-sensor. The control module is configured to receive the first array of photo-sensor outputs from the first photo-sensor and the second array of photo-sensor outputs from the second photo-sensor. The control module is further configured to one or more steps disclosed herein. For instances, the control module is configured to construct a first spectral image dataset by selecting a first subset of the first array of photo-sensor outputs and a first subset of the second array of photo-sensor outputs generated by resolving light filtered by the first plurality of filter types; and construct the second spectral image dataset by selecting a second subset of the first array of photo-sensor outputs and a second subset of the second array of photo-sensor outputs generated by resolving light filtered by the second plurality of filter types.

In an embodiment, the dichroic optics is a dichroic mirror or a dichroic splitter that reflects one of the first and second light beams and passes the other of the first and second light beams.

In an embodiment, each filter element in the first array of filter elements is one of the first plurality of filter-types, and each filter element in the second array of filter elements is one of the second plurality of filter-types. The first spectral image dataset is the first array of photo-sensor outputs and the second spectral image dataset is the second array of photo-sensor outputs.

A still further aspect of the present disclosure provides a nontransitory computer-readable storage medium storing one or more programs. The one or more programs comprises instructions, which when executed by a device comprising a processor and memory, cause the device to perform the methods or any one or more steps of the methods disclosed herein.

BRIEF DESCRIPTION OF THE DRAWINGS

So that the present disclosure can be understood in greater detail, a more particular description may be had by reference to aspects of various implementations, some of which are illustrated in the appended drawings. The appended drawings, however, merely illustrate the more pertinent aspects of the present disclosure and are therefore not to be considered limiting, as the description may admit to other effective aspects and arrangements.

Figure 1:
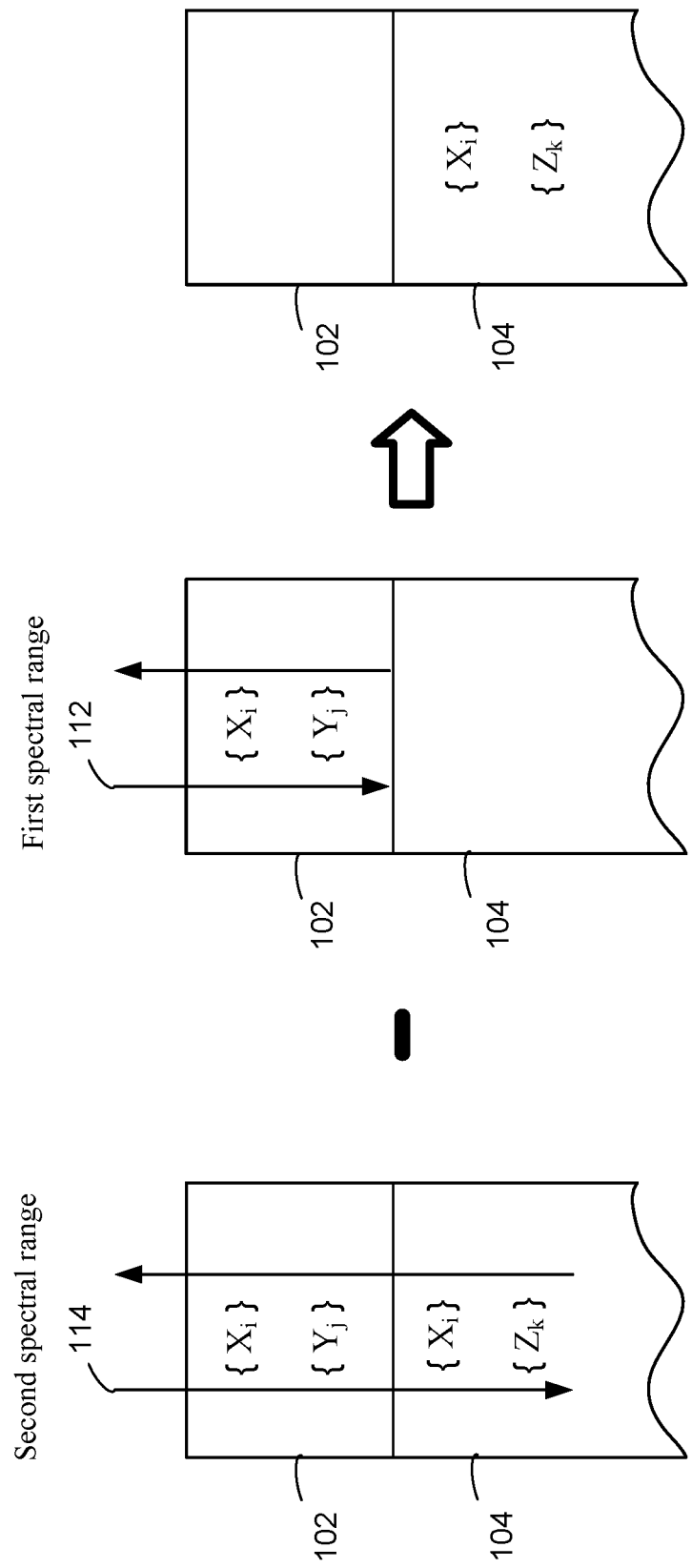
FIG. 1 is a schematic diagram illustrating an example method in accordance with an embodiment of the present disclosure.

In accordance with common practice the various features illustrated in the drawings may not be drawn to scale. The dimensions of various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to implementations of the embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the embodiments set forth in this disclosure can be made without departing from their spirit and scope, as will be apparent to those skilled in the art. The specific embodiments described herein are offered by way of example only, and the disclosure is to be limited only by the terms of the appended claims, along with the full scope of equivalents to which such claims are entitled.

In various embodiments, the present invention provides hyperspectral/multispectral imaging systems, methods and devices for determining hyperspectral/multispectral signature(s) of a region of interest (ROI), and in particular, for determining hyperspectral/multispectral signature(s) at different depths of an ROI. In many implementations, different depths of an ROI are approximated by layers. An ROI can have any suitable number of layers including but not limited to two, three, four or more than four layers. A layer of an ROI can be a single layer or a cluster of multiple sublayers. Adjacent layers of an ROI can have but not necessarily have to have a clear or flat boundary.

For instance, the structure of skin, while complex, can be approximated as two separate and structurally different layers, namely the epidermis and dermis. Below the dermis is a closely associated layer, namely the deeper subcutaneous tissue (hypodermis). The epidermis, dermis, and deeper subcutaneous tissue have very different scattering and absorption properties due to differences of composition.

The epidermis is the outer layer of skin. It has specialized cells called melanocytes that produce melanin pigments. Melanin is the major chromophore in the epidermis in the visible range. Its absorption profile demonstrates an exponential-like decay towards the red part of the spectrum. For further details, see G. H. Findlay, "Blue Skin," British Journal of Dermatology 83(1), 127-134 (1970), the content of which is incorporated herein by reference in its entirety for all purposes.

The dermis has a dense collection of collagen fibers and blood vessels, and its optical properties are very different from that of the epidermis. Absorption of light of a bloodless dermis is negligible. However, blood-born pigments like oxy- and deoxy-hemoglobin and water are major absorbers of light in the dermis. Scattering by the collagen fibers and absorption due to chromophores in the dermis determine the depth of penetration of light through skin.

The deeper subcutaneous tissue (hypodermis) is made of fat and connective tissue. It contains larger blood vessels (e.g., veins, arteries) and nerves than those found in the dermis. Blood-born pigments like oxy- and deoxy-hemoglobin and water are major absorbers of light in the deeper subcutaneous tissue.

Light used to illuminate the surface of a subject will penetrate into the skin. The extent to which the light penetrates depends on the wavelength of the particular radiation. For example, with respect to visible light, the longer the wavelength, the farther the light will penetrate into the skin. For example, only about 32% of 400 nm violet light penetrates into the dermis of human skin, while greater than 85% of 700 nm red light penetrates into the dermis or beyond (see, Capinera J. L., Encyclopedia of Entomology, 2nd Edition, Springer Science (2008) at page 2854, the content of which is hereby incorporated herein by reference in its entirety for all purposes).

Accordingly, different wavelengths of light may be used to examine different depths of a subject's skin tissue. Generally, high frequency, short-wavelength visible light is useful for investigating elements present in the epidermis, while lower frequency, long-wavelength visible light is useful for investigating both the epidermis and dermis. Furthermore, certain infra-red wavelengths are useful for investigating the epidermis, dermis, and subcutaneous tissues.

In many implementations, the systems, methods and devices employ two or more spectral ranges of the spectrum, or a wide range that includes two or more spectral ranges of the spectrum, to illuminate the ROI. The two or more spectral ranges can be continuous, discontinuous or overlapping with respect to each other. Illumination of the ROI at different spectral ranges is performed either concurrently or subsequently. Light of different spectral ranges generally interacts with the ROI differently and thus penetrates into different depths of the ROI. Light reflected or backscattered off from the ROI (in some cases, including light emitted by, for example, fluoresce or photoluminesce in the ROI in response to irradiation with the light) is measured and analyzed to extract hyperspectral/multispectral signature(s) at different depths of the ROI. In some implementations, hyperspectral/multispectral signature(s) at a deeper layer of the ROI is obtained by decomposition or de-convolution of the hyperspectral/multispectral signature(s) obtained at different depths of the ROI.

As a non-limiting example, FIG. 1 illustrates an ROI illuminated by a light of a first spectral range 112 and a second spectral range 114. The ROI is represented by a first layer 102 and a second layer 104. Each of the first and second layers contains one or more chromophores indicated by $\{X_i\}$, where i can be one, two, three or greater. That is, chromophore $X_i$ is present in both the first and second layers. In some cases, the first or second layer may contain one or more additional chromophores that are absent in the other layer. For instance, the first layer may contain one or more additional chromophores indicated by $\{Y_j\}$ where j can be one, two, three, or greater. Chromophore $Y_j$ is absent in the second layer. Similarly, the second layer may contain one or more additional chromophores indicated by $\{Z_k\}$ where k can be one, two, three, or greater. Chromophore $Z_k$ is absent in the first layer. For instance, in some implementations, the first layer is the epidermis and dermis of a skin of a human body, and the second layer is the subcutaneous tissue of the skin. In such cases, chromophores $\{X_i\}$ present in both the first layer and the second layer include oxy-hemoglobin, deoxy-hemoglobin and water. The first layer includes an additional chromophore, namely melanin, which is absent in the second layer.

Light is applied to the surface of the ROI, and interacts with the ROI. Interactions between the light of different wavelengths and each individual component of the ROI are different. Depending on the wavelength of the light as well as the components and the structure of the ROI, light of various wavelengths will penetrate into different depths (e.g., different layers) of the ROI. For instance, light of the first spectral range penetrates into the first layer, and light of the second spectral range penetrates into the second layer. Reflected or backscattered light of the first spectral range from the ROI carries information about the first layer. By measuring the reflected or backscattered light of the first spectral range from the ROI, hyperspectral/multispectral signature(s) (e.g., concentrations of a chromophore) in the first layer can be determined. Similarly, reflected or backscattered light of the second spectral range from the ROI carries information about the combination of the first and second layers. By measuring the reflected or backscattered light of the second spectral range from the ROI, hyperspectral/multispectral signature(s) in the combination of the first and second layers can be determined.

Hyperspectral/multispectral signature(s) in the second layer can be determined by decomposing or de-convoluting the hyperspectral/multispectral signature(s) measured in the first and second spectral ranges. For instance, in some implementations, light of a visible range and a near infrared range is applied to a surface of a skin. Application of the light at different ranges can be concurrent or subsequent. Light of the visible range generally penetrates into the epidermis and dermis of the skin, and light of the near infrared range generally penetrates into the deeper subcutaneous tissue. Measurement of the reflected or backscattered light of the visible range produces oxy-hemoglobin and/or deoxy-hemoglobin concentration values in the epidermis and dermis of the skin. Measurement of the reflected or backscattered light of the near infrared range produces oxy-hemoglobin and/or deoxy-hemoglobin concentration values in the combination of the epidermis, dermis and deeper subcutaneous tissue. The oxy-hemoglobin concentration in the deeper subcutaneous tissue can be determined, for example, by subtracting the oxy-hemoglobin concentration measured by the visible light range from the oxy-hemoglobin concentration measured by the near infrared range. Similarly, the deoxy-hemoglobin concentration in the deeper subcutaneous tissue can be determined, for example, by subtracting the deoxy-hemoglobin concentration measured by the visible light range from the deoxy-hemoglobin concentration measured by the near infrared range. As such, the determined oxy-hemoglobin and/or deoxy-hemoglobin concentration in the deeper subcutaneous tissue are decoupled from the oxy-hemoglobin and/or deoxy-hemoglobin concentration in the epidermis and dermis of the skin, and are substantially free from the contribution by the oxy-hemoglobin and/or deoxy-hemoglobin concentration in the epidermis and dermis of the skin. Accordingly, it provides more accurate information on the condition of the deeper tissue without complication of the surface oxygenation. Together with the spectral signature(s) in the epidermis and dermis, it provides more accurate or more thorough information about the different layers of the tissue of the subject. In some cases, it can serve to highlight the locations of the veins and arteries in the deeper tissue.

In some implementations, the first or second spectral range is selected to identify a particular type of spectral signature(s) in an object (e.g., in a tissue of a subject). In some implementations, one of the first and second spectral ranges is selected to distinguish spectral signatures related to a first medical condition (e.g., a pressure ulcer) from healthy tissue (e.g., non-ulcerated tissue), and the other of the first and second spectral ranges is selected to distinguish spectral signatures related to a second medical condition (e.g., a cancerous tissue) from healthy tissue (e.g., a non-cancerous tissue). Accordingly, in some implementations, the systems, methods and devices disclosed herein will have a plurality of imaging modalities, each individual imaging modality related to the investigation of a different medical condition.

In some embodiments, the present invention also provides hyperspectral/multispectral imaging systems, methods and devices for effectively extracting more important spectral signatures. For instance, in some implementations, one or more spectral signatures are known or predetermined. In such cases, an imaging analysis is focused on determination of other spectral signatures. For instance, in an implementation, the concentration of melanin may be estimated by the slope of the decay (e.g., a slope between 610 nm and 620 nm). The absorption by melanin may be calculated based on the known absorption characteristics of melanin and then subtracted from the total absorption measured by the hyperspectral/multispectral imaging. Similarly, in an embodiment, the concentration of water may be estimated and then subtracted from the total absorption measured by the hyperspectral/multispectral imaging. As such, the spectral image dataset can be exploited more effectively to extract the concentrations of oxy-hemoglobin and deoxy-hemoglobin. In addition, the complexity of computation and requirement of computational power are reduced.

I. Example Hyperspectral/Multispectral Imaging Methods

Figure 2:
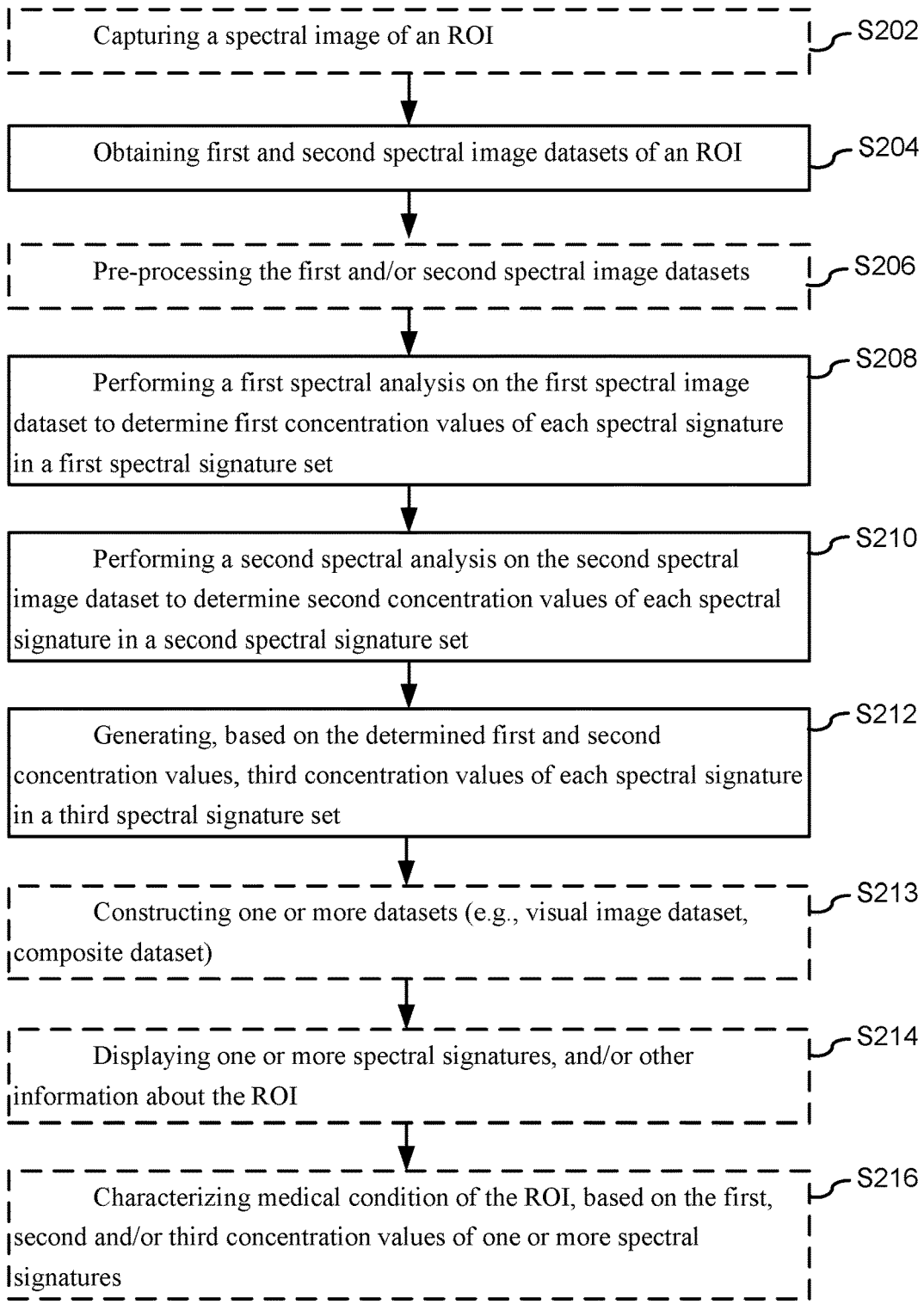
FIG. 2 is a flowchart illustrating an example method in accordance with an embodiment of the present disclosure.

FIG. 2 illustrates an example method for determining hyperspectral/multispectral signature(s) at different depths of an ROI. The method 200 is performed by a device comprising a processor and memory. The method in general includes: (i) obtaining a first spectral image dataset and a second spectral image dataset of the ROI at step S204, (ii) performing a first spectral analysis on the first spectral image dataset to determine values of a first spectral signature set at step S208, (iii) performing a second spectral analysis on the second spectral image dataset to determine values of a second spectral signature set at step S210, and (iv) generating values of a third spectral set at step S212.

In some implementations, the method includes one or more additional, alternative, or optional steps. Examples of additional, alternative, or optional steps include but not limited to light source control, image capturing, image registration, pre-processing, image classification, post-processing, data transmission, communication with external device/network, medical diagnosis, and display. By way of example, FIG. 2 illustrates a capturing step S202, a pre-processing step S206, a constructing step S213, a displaying step S214, and a characterizing step S216. It should be noted that the method can include any suitable number of additional, alternative, or optional steps, and in any suitable combination.

It should be noted that the steps of the method illustrated in the Figures are not necessarily in order. For instance, in FIG. 2, the first spectral analysis at S208 can be performed concurrently with the second spectral analysis at S210. The first spectral analysis at S208 can also be performed sequentially before or after the second spectral analysis at S210. As another example, the displaying step S214 can be performed in real time. It can also be performed at any particular time, for example, controlled by a controller or by a user. It can further be performed after the characterizing step S216, and can be used to display the medical condition of the ROI.

In some embodiments, an imaging method for providing medical information of a region of interest (ROI) of a subject includes: (i) obtaining a first spectral image dataset of the ROI, (ii) obtaining a second spectral image dataset of the ROI, (iii) performing a first spectral analysis on the first spectral image dataset, (iv) performing a second spectral analysis on the second spectral image dataset, and (v) generating third concentration values of each spectral signature in a third spectral signature set. The imaging method is performed by a device comprising a processor and memory. Examples of the region of interest (ROI) of a subject includes but is not limited to epidermis tissue, dermis tissue, subcutaneous tissue, or any combination thereof. The first spectral image dataset comprises a first plurality of signal arrays, and each respective signal array in the first plurality of signal arrays is characterized by a single corresponding spectral band in a first plurality of spectral bands, wherein each spectral band in the first plurality of spectral bands is within a first spectral range that penetrates tissue with a first average depth. The second spectral image dataset comprises a second plurality of signal arrays, and each respective signal array in the second plurality of signal arrays is characterized by a single corresponding spectral band in a second plurality of spectral bands, wherein each spectral band in the second plurality of spectral bands is within a second spectral range that is different than the first spectral range that penetrates tissue with a second average depth, wherein the second average depth is deeper than the first average depth. The first spectral analysis on the first spectral image dataset is performed to determine first concentration values of each spectral signature in a first spectral signature set at each respective point in an array of points corresponding to a two-dimensional area of the ROI, wherein the first spectral signature set comprises a first spectral signature. The second spectral analysis on the second spectral image dataset is performed to determine second concentration values of each spectral signature in a second spectral signature set at each respective point in the array of points, wherein the second spectral signature set comprises the first spectral signature. Third concentration values of each spectral signature in the third spectral signature set are generated at each respective point in the array of points, wherein the third spectral signature set comprises the first spectral signature, wherein the third concentration values of the first spectral signature are generated by compensating the second concentration values of the first spectral signature with the first concentration values of the first spectral signature at each respective point in the array of points.

Capturing Image(s)

At optional or additional step S202, the method captures a spectral image of the ROI so as to provide an image dataset or image datasets (e.g., first and second spectral image datasets) of the ROI. In an implementation, a single spectral image is captured to provide both the first and second spectral image datasets of the ROI. For instance, in an implementation, the single spectral image is captured by exposing a photo-sensor to a light with a wide spectral range that include both the first and second spectral ranges.

Figure 6:
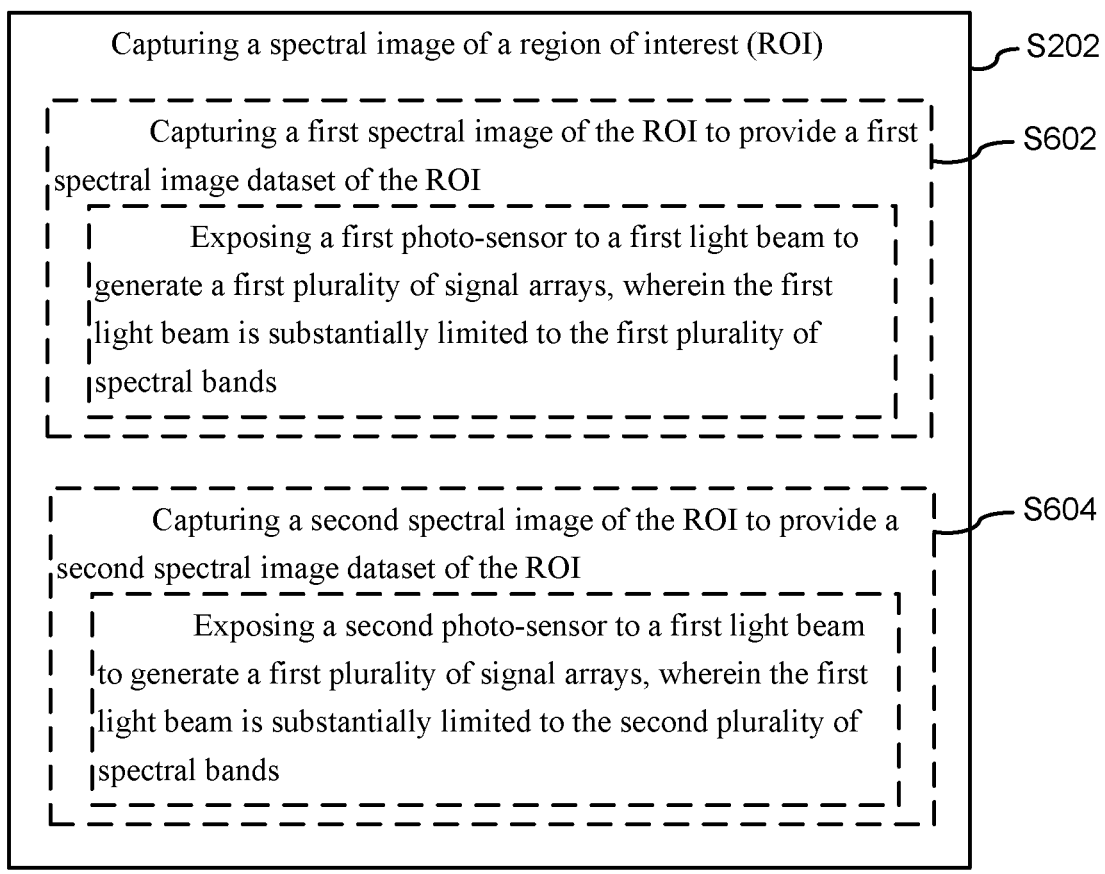
FIG. 6 is a flowchart illustrating an example of capturing an image in accordance with an embodiment of the present disclosure.

Alternatively, in some implementations, the method captures two or more separate spectral images to provide the first and second spectral image datasets of the ROI. For instance, FIG. 6 illustrates a first spectral image of the ROI captured at step S602 to provide the first spectral image dataset of the ROI, and a second spectral image of the ROI captured at step S604 to provide the second spectral image dataset of the ROI. The capturing of the first and second spectral images can be performed independently from each other, subsequently from each other, or substantially concurrently with each other. In an implementation, the first spectral image is captured by exposing a first photo-sensor to a first light beam that is substantially limited to the first plurality of spectral bands, and the second spectral image is captured by exposing a second photon-sensor to a second light beam that is substantially limited to the second plurality of spectral bands.

Obtaining Dataset(s)

At step S204, the method obtains a first spectral image dataset and a second spectral image dataset of the ROI. The first and second image datasets can be obtained concurrently, sequentially, or separately. For instance, the method can obtain a first spectral image dataset of the ROI and obtains separately a second spectral image dataset of the ROI either before or after obtaining the first spectral dataset. Alternatively, the method can construct the first and second spectral dataset from a larger spectral image dataset in a relatively wider spectral range, for instance, by selecting a subset from the larger spectral image dataset to form each of the first and second spectral image dataset.

The first spectral image dataset is characterized by a first spectral range and the second spectral image dataset is characterized by a second spectral range. The first and second spectral ranges are different from each other but can be overlapped with each other. In an implementation, the second spectral range comprises a spectrum having wavelengths longer than the first spectral range. For instance, the first spectral range includes component wavelengths in the range of about 400 nm to about 700 nm and the second spectral range includes component wavelengths in the range of about 700 nm to about 2500 nm.

In some implementations, the first spectral image dataset comprises a first plurality of signal arrays. Each respective signal array in the first plurality of signal arrays is characterized by a single corresponding spectral band in a first plurality of spectral bands. Each spectral band in the first plurality of spectral bands is within a first spectral range. The second spectral image dataset comprises a second plurality of signal arrays. Each respective signal array in the second plurality of signal arrays is characterized by a single corresponding spectral band in a second plurality of spectral bands, wherein each spectral band in the second plurality of spectral bands is within a second spectral range that is different than the first spectral range.

In an implementation, the first spectral range has a spectral range between 450 nm and 700 nm. In an implementation, the first plurality of spectral bands comprises four to twenty spectral bands, four to sixteen spectral bands, eight to sixteen spectral bands, or any suitable number of spectral bands. In an implementation, the first plurality of spectral bands comprises spectral bands having central wavelengths of: 520±3 nm, 540±3 nm, 560±3 nm, 580±3 nm, 590±3 nm, 610±3 nm, 620±3 nm, and 660±3 nm, wherein each spectral band in the first plurality of spectral bands has a full width at half maximum of less than 20 nm, less than 15 nm, or less than 10 nm. In an implementation, the spectral bands having central wavelengths of 520±3 nm, 540±3 nm, 560±3 nm, 580±3 nm, 590±3 nm, 610±3 nm, and 620±3 nm have a full width at half maximum of less than 15 nm, and wherein the spectral bass-band having the central wavelength of 660±3 nm has a full width at half maximum of less than 20 nm.

In an implementation, the second spectral range has a spectral range between 700 nm and 1300 nm, or between 700 nm and 1000 nm. In an implementation, the second plurality of spectral bands comprises four to sixteen spectral bands, four to twelve spectral bands, four to eight spectral bands, or any suitable number of spectral bands. In an implementation, the second plurality of spectral bands comprises spectral bands having central wavelengths of: 740±3 nm, 760±3 nm, 850±3 nm, 860±3 nm, 880±3 nm, and 940±3 nm, wherein each spectral band in the second plurality of spectral bands has a full width at half maximum of less than 20 nm, less than 15 nm, or less than 10 nm. In an implementation, the second plurality of spectral bands further comprises a spectral band having a central wavelength of 830±3 nm or 835±3 nm with a full width at half maximum of less than 20 nm, less than 15 nm, or less than 10 nm.

Figure 3:
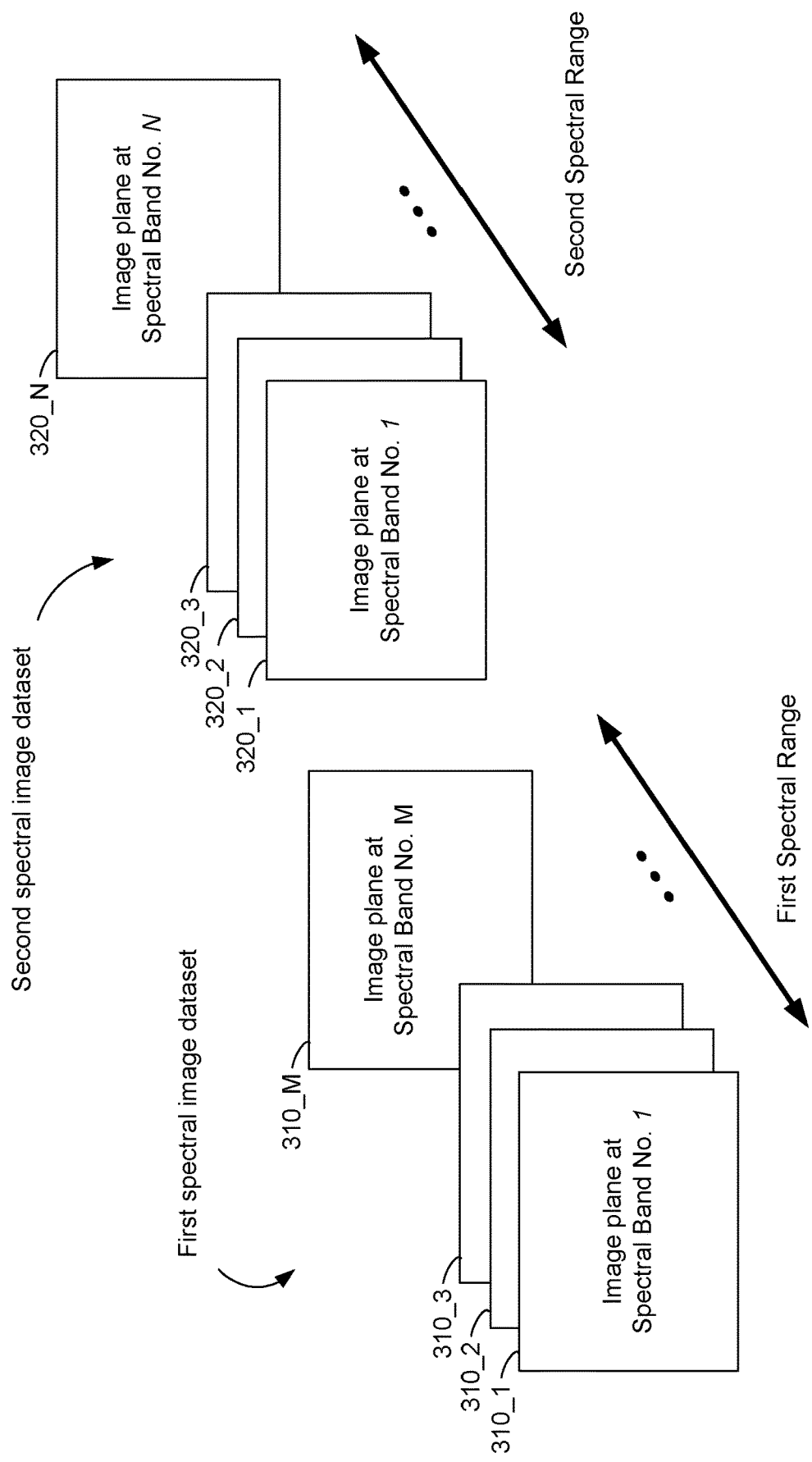
FIG. 3 is a schematic diagram illustrating spectral image datasets in accordance with an embodiment of the present disclosure.

In some implementations, the first spectral image dataset is a hyperspectral/multispectral cube of the ROI produced by resolving light at each spectral band in the first plurality of spectral bands. Such a first spectral image dataset can be represented by a first plurality of spectral image planes such as image planes 310_1, 310_2, . . . 310_M illustrated in FIG. 3. Each spectral image plane in the first plurality of spectral image planes is produced by resolving light at a specific spectral band in the first plurality of spectral bands. Similarly, in some implementations, the second spectral image dataset is a hyperspectral/multispectral cube of the ROI produced by resolving light at each spectral band in the second plurality of spectral bands. Such a second spectral image dataset can be represented by a second plurality of spectral image planes such as image planes 320_1, 320_2, . . . 320_N illustrated in FIG. 3. Each spectral image plane in the second plurality of spectral image planes is produced by resolving light at a specific spectral band in the second plurality of spectral bands.

For instance, as a non-limiting example, in some implementations, the first spectral image dataset is a hyperspectral/multispectral cube of a tissue of a subject at a visible light range. Such a spectral cube can be obtained, for example, by imaging the tissue of the subject with a visible light, or by using a photo-detector that receives light substantially limited to the visible light range. The second spectral image dataset is a hyperspectral/multispectral cube of the tissue of the subject at an infrared or a near infrared range. In such implementations, the first spectral image dataset contains information about the outer layer (e.g., capillary bed, epidermis, dermis) of the tissue of the subject, and the second spectral image dataset contains information about the combination of the outer layer and deeper layer(s) (e.g., subcutaneous tissue) of the tissue of the subject.

Pre-Processing Dataset(s)

At optional or additional step S206, the method performs a pre-processing to enhance the first and/or second spectral image dataset for the subsequent spectral analysis or other process. The pre-processing is performed using one or more functions, including but not limited to image blurring, noise filtering, sharpening, edge recognition, contrast enhancement and segmentation. In an implementation, the pre-processing employs only one function, for example, to remove a noise or an irregularity from the first and/or second spectral image dataset. In another implementation, the pre-processing employs multiple functions, for example, to remove a noise or an irregularity from the first and/or second spectral image dataset, and to blurring or sharpening certain features contained by the first and/or second spectral image dataset. In still another implementation, no pre-processing is performed. For instance, in some implementations, the first and/or second spectral image dataset has been pre-processed before it is obtained. In such implementations, a pre-processing is unnecessary.

Determining Spectral Signature(s)

At step S208, the method performs a first spectral analysis on the first spectral image dataset to determine first concentration values of one or each spectral signature in a first spectral signature set. The first spectral signature set includes one or more spectral signatures contained in the ROI. It should be noted that the first spectral data set can include a partial set or a whole set of the spectral signatures contained in the ROI. For instance, in an implementation where the ROI includes four spectral signatures (e.g., melanin, oxy-hemoglobin, deoxy-hemoglobin, and water), the first spectral signature set can include any one, any two, any three, or all of the four spectral signatures.

In some implementations, the first spectral signature set includes a first spectral signature (e.g., oxy-hemoglobin), and the first spectral analysis is performed to determine the first concentration values of the first spectral signature. Additionally, optionally or alternatively, the first spectral signature set includes a second spectral signature (e.g., deoxy-hemoglobin), and the first spectral analysis is performed to determine the first concentration values of the second spectral signature.

Spectral analysis can be performed using various algorithms, including but not limited to principal component analysis (PCA), fuzzy C-means clustering, multivariate analysis, least-squares regression, Gaussian superposition, Monte Carlo simulation, Beer-Lambert law, and Levenberg-Marquardt nonlinear least-squares analysis. PCA and fuzzy C-means clustering assigns each data point a degree of membership to a component or cluster. Monte Carlo simulation requires a large amount of calculation. Gaussian superposition algorithm de-convolves the relative contributions of chromophores by approximating them with superposition of Gaussians.

A spectral analysis can be performed on the first spectral image dataset at an array of points. The array of points corresponds to a two-dimensional area of a region of interest (ROI) (e.g., a two-dimensional area of the tissue of a subject). In some implementations, the spectral analysis includes determination of first absorption values at each respective point in the array of points and at each single spectral band in at least a subset of the first plurality of spectral bands. As used herein, the term "at least a subset of" refers to "a subset of" or "a whole set of". Similarly, the term "at least the subset of" refers to "the subset of" or "the whole set of".

In an implementation, the Beer-Lambert Law is employed to determine the first absorption values (e.g., normalized absorption values) based on the first spectral image dataset, a fully illuminated reference dataset and a completely blocked dataset. Based on the determined first absorption values, in some implementations, first concentration values of each spectral signature in the one or more spectral signatures are determined at each respective point in the array of points. In an implementation, a nonlinear least square minimization method is used to determine the first concentration values of each spectral signature in the one or more spectral signatures. For instance, in implementations where the first spectral image dataset is a spectral cube produced by resolving light of a visible range and the second spectral image dataset is a spectral cube produced by resolving light of an infrared or near-infrared range, first concentration values of oxy-hemoglobin, deoxy-hemoglobin, and/or other content of the tissue are determined at each respective point in the array of points.

Figure 4:
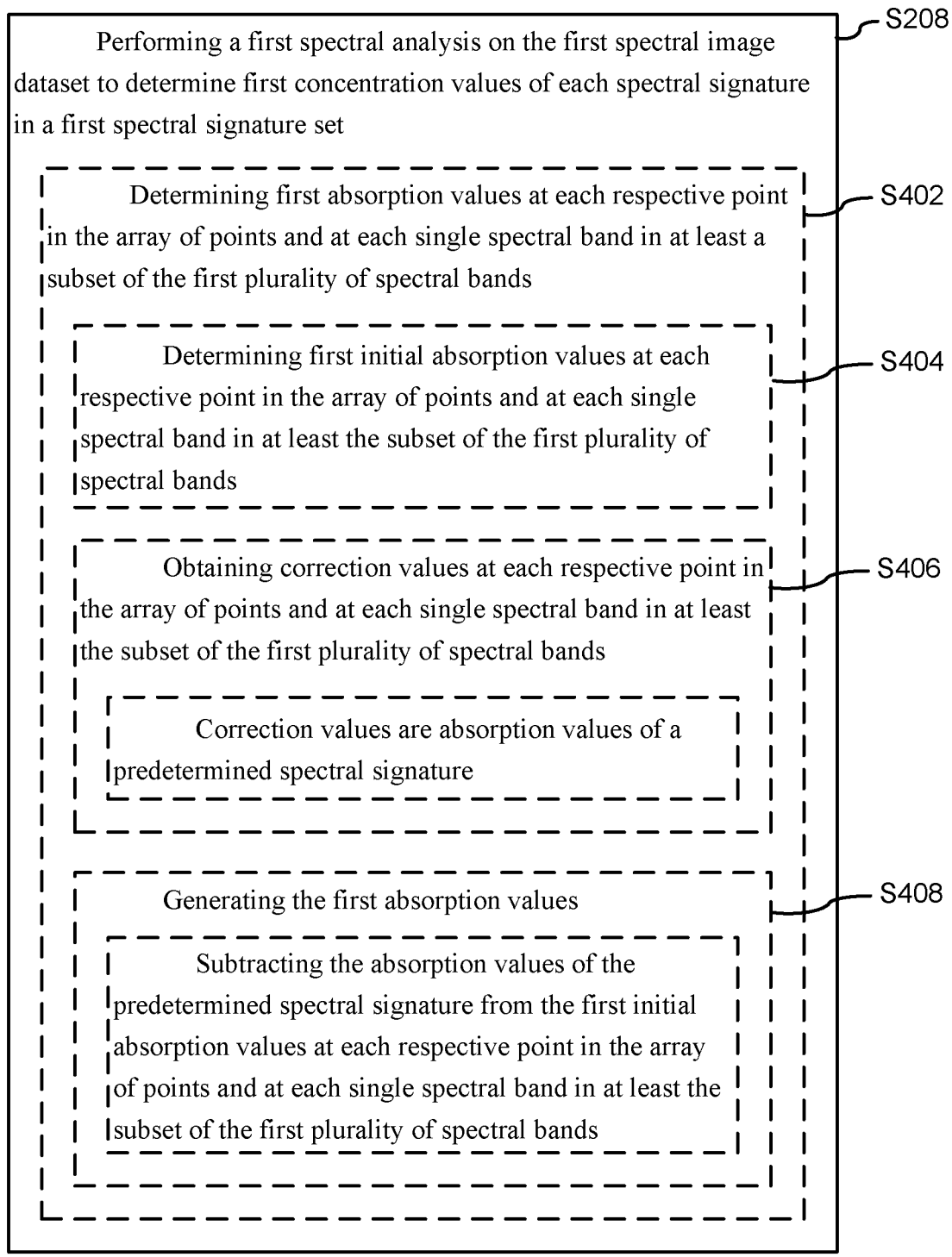
FIG. 4 is a flowchart illustrating an example of a first spectral analysis in accordance with an embodiment of the present disclosure.

For instance, FIG. 4 illustrates a first spectral analysis in accordance with some embodiments of the present invention. In some implementations, the method calculates, at step S402, first absorption values at each respective point in an array of points and at each single spectral band in at least a subset of the first plurality of spectral bands. The array of points corresponds to a two-dimensional area of the ROI. A respective point in the array of points can be a pixel or a group of pixels in a corresponding spectral image or image plane. In an implementation, the first absorption values are calculated using the Beer-Lambert law or a modified Beer-Lambert law. For instance, $A1(x, y, \lambda)$ can be expressed as a function of $I1(x, y, \lambda)$, where $A1(x, y, \lambda)$ represents the first absorption value at point $(x, y)$ and spectral band $\lambda$, and $I1(x, y, \lambda)$ represents the signal value of the first spectral image dataset at point $(x, y)$ and spectral band $\lambda$. In some cases, $I1(x, y, \lambda)$ is an apparent or a normalized signal value of the first spectral image dataset at point $(x, y)$ and spectral band $\lambda$. The first concentration values of each spectral signature in the first spectral signature set at each respective point in the array of points are then determined based on the first absorption values, for example, by a nonlinear least square minimization method.

In some applications, concentration values of one or more spectral signatures are known or can be determined by other means. For instance, in an application of a hyperspectral/multispectral imaging of a skin, melanin, oxy-hemoglobin, deoxy-hemoglobin and water are major chromophores in the visible and near infrared ranges. As the absorption profile of melanin demonstrates an exponential-like decay towards the red, the concentration of melanin may be estimated, for instance, by the slope of the decay (e.g., a slope between 610 nm and 620 nm). The absorption by melanin can then be calculated based on the known absorption characteristics of melanin and can be subtracted from the total absorption measured by the hyperspectral/multispectral imaging. Similarly, in an embodiment, the concentration of water may be estimated and then subtracted from the total absorption measured by the hyperspectral/multispectral imaging. As such, the spectral image dataset can be exploited more effectively to extract the concentrations of oxy-hemoglobin and deoxy-hemoglobin. In addition, the complexity of computation and requirement of computational power are reduced.

Accordingly, in some implementations, the method calculates, at step S404, first initial absorption values at each respective point in the array of points and at each single spectral band in at least the subset of the first plurality of spectral bands. For instance, $A0(x, y, \lambda)$ can be expressed as a function of $I1(x, y, \lambda)$, where $A0(x, y, \lambda)$ represents the first initial absorption value at point $(x, y)$ and spectral band $\lambda$. The method obtains, at step S406, correction values at each respective point in the array of points and at each single spectral band in at least the subset of the first plurality of spectral bands. In an implementation, the correction values are absorption values of a predetermined spectral signature (e.g., melanin, water, or other spectral signature). The method then generates, at step S408, the first absorption values, for example, by compensating the first initial absorption values with the correction values at each respective point in the array of points and at each single spectral band in at least the subset of the first plurality of spectral bands. In an implementation, the first absorption values are generated by subtracting the absorption values of the predetermined spectral signature from the first initial absorption values at each respective point in the array of points and at each single spectral band in at least the subset of the first plurality of spectral bands. For instance, $A1(x, y, \lambda)=A0(x, y, \lambda)-C(x, y, \lambda)$, where $C(x, y, \lambda)$ represents the absorption value of the predetermined spectral signature at point $(x, y)$ and spectral band $\lambda$. In a case where there are more than one predetermined spectral signatures, $A1(x, y, \lambda)=A0(x, y, \lambda)-\Sigma C_i(x, y, \lambda)$, where $\Sigma$ represents summation over i which can be two or more.

Referring again to FIG. 2, at step S210, the method performs a second spectral analysis on the second spectral image dataset to determine second concentration values of one or each spectral signature in a second spectral signature set. The second spectral signature set includes one or more spectral signatures contained in the ROI. Like the first spectral signature set, the second spectral signature set can include a partial set or a whole set of the spectral signatures contained in the ROI. The first and second spectral signature sets can be but not necessarily have to be the same as each other.

In some implementations, the first and second spectral signature sets include one or more common signatures. For instance, the second spectral signature set can include the first spectral signature (e.g., oxy-hemoglobin), and the second spectral analysis is performed to determine the second concentration values of the first spectral signature. Additionally or optionally, the second spectral signature set can include the second spectral signature (e.g., deoxy-hemoglobin), and the second spectral analysis is performed to determine the second concentration values of the second spectral signature.

Figure 5:
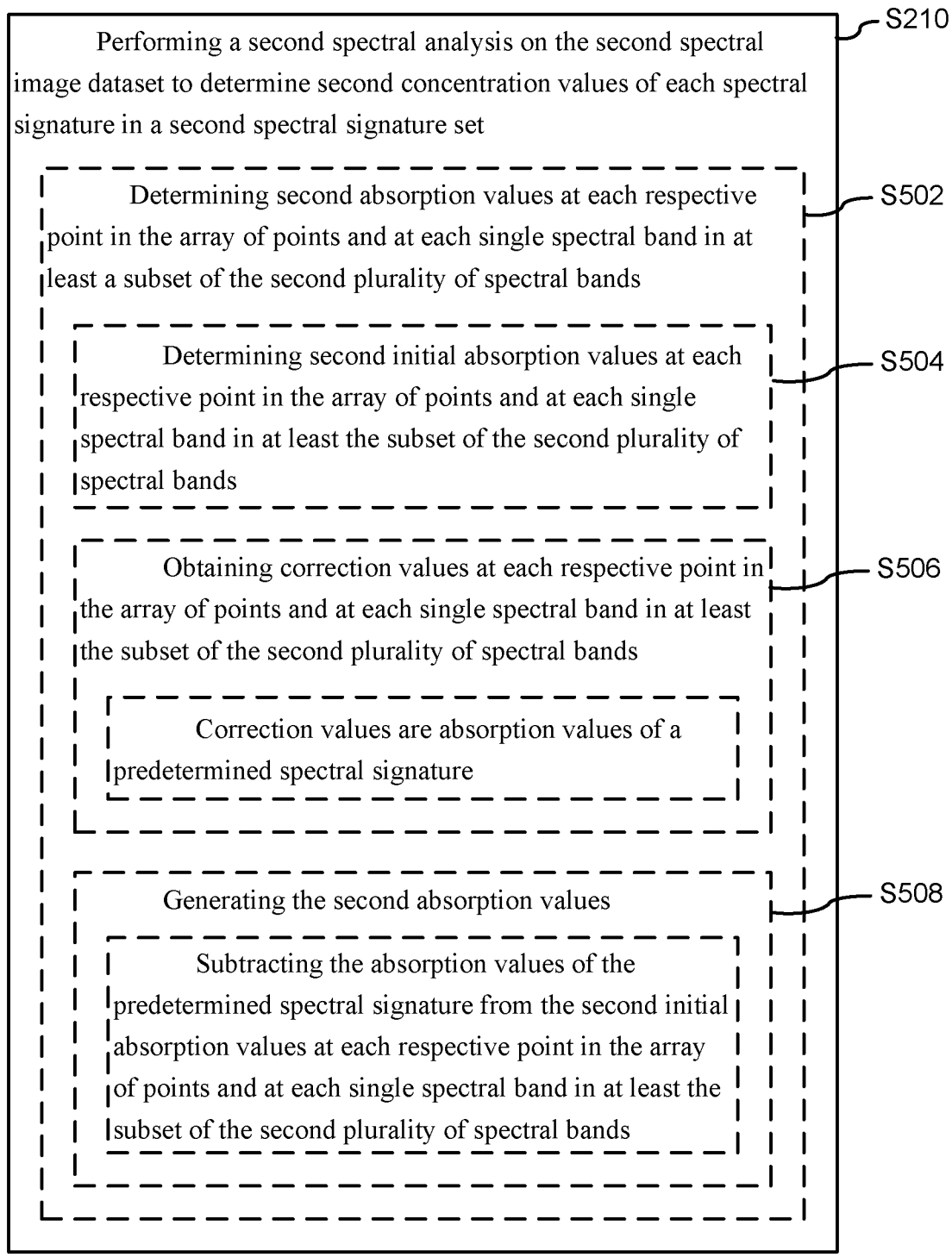
FIG. 5 is a flowchart illustrating an example of a second spectral analysis in accordance with an embodiment of the present disclosure.

Similar to the first spectral analysis, the second spectral analysis can be performed using various algorithms. The same or different algorithms can be employed to perform the first and second spectral analysis. In an implementation, the second spectral analysis is performed in a similar fashion as the first spectral analysis, as illustrated in FIG. 5. For instance, at step S502, the method calculates second absorption values at each respective point in an array of points and at each single spectral band in at least a subset of the second plurality of spectral bands. The second concentration values of each spectral signature in the second spectral signature set at each respective point in the array of points are then determined based on the second absorption values.

In an implementation, calculation of the second absorption values includes: (i) step S504 that determines, using the second spectral image dataset, second initial absorption values at each respective point in the array of points and at each single spectral band in at least the subset of the second plurality of spectral bands; (ii) step S506 that obtains correction values at each respective point in the array of points and at each single spectral band in at least the subset of the second plurality of spectral bands; and (iii) step S508 that generates the second absorption values by compensating the second initial absorption values with the correction values at each respective point in the array of points and at each single spectral band in at least the subset of the second plurality of spectral bands.

Extracting Spectral Signature(s) At Deeper Layer(s)

In some implementations, the first concentration values of a particular spectral signature are concentration values of the particular spectral signature in a first or outer layer (e.g., the epidermis and/or dermis) of the ROI. The second concentration values of the particular spectral signature are combined concentration values of the particular spectral signature in both the first layer and a second or deeper layer (e.g., subcutaneous tissue) of the ROI. In such implementations, the method further includes step S212 that generates, based on the determined first and second concentration values, third concentration values of one or each spectral signature in a third spectral signature set. In an implementation, the third concentration values are calculated based on the first and second concentration values, using an algorithm including but not limited to addition, subtraction, multiplication, division, or other mathematical function.

In an implementation, the third concentration values of a specific spectral signature in the third spectral signature set are generated by subtracting the first concentration values of the specific spectral signature from the second first concentration values of the specific spectral signature. For instance, the third concentration values of the first spectral signature (e.g., oxy-hemoglobin) in the third spectral signature set are generated by subtracting the first concentration values of the first spectral signature from the second first concentration values of the first spectral signature. Similarly, the third concentration values of the second spectral signature (e.g., deoxy-hemoglobin) in the third spectral signature set are generated by subtracting the first concentration values of the second spectral signature from the second first concentration values of the second spectral signature.

Constructing Dataset(s)

At optional or additional step S213, the method constructs one or more datasets, for example, for display and/or for providing medical information about the ROI. For instance, in some implementations, the method constructs a visual image dataset for displaying as a visual image of the ROI of the subject. In an implementation, the visual image dataset is constructed by concatenating three spectral planes (e.g., red, green, and red) from the first spectral dataset, the second spectral dataset or both.

In some implementations, the method constructs a composite image dataset for displaying as an image. A composite image dataset can be formed in a variety of ways. In an implementation, a composite image dataset is formed by combining at least a subset of the first spectral image dataset with at least a subset of the second spectral image dataset. In another implementation, a composite image dataset is formed by combining at least a subset of the first concentration values of one or more spectral signatures in the first spectral set and at least a subset of the third concentration values of one or more spectral signatures in the third spectral set.

Selection of a subset can be based on spatial, spectral, or both spatial and spectral consideration. For instance, in an implementation, selection of the subset of the first or second spectral image dataset is based on spectral consideration. A subset of the first spectral image dataset is selected such that it corresponds to at least one image plane representing at least one determined signature from the first spectral image dataset (e.g., oxyhemoglobin or deoxyhemoglobin). A subset of the second spectral image dataset is selected such that it corresponds to at least one image plane representing at least one determined additional signature from the second spectral image dataset (e.g., water). As a result, the composite spectral image dataset contains information about the ROI of the subject from both spectral datasets.

As another non-limiting example, in an implementation, selection of the subset of the first or third concentration values is based on spatial consideration. A subset of the first concentration values is selected such that it corresponds to a first sub-area of the two-dimensional area of the ROI. A subset of the third concentration values is selected such that it corresponds to a second sub-area of the two-dimensional area of the ROI. For instance, the subset of the third concentration values is selected to provide information about a wound bed of a tissue of a subject, and the subset of the first concentration values is selected to provide information about the surrounding area of the wound bed.

Displaying Dataset(s)

At optional or additional step S214, the method displays information about the ROI. The information can be displayed on an internal housing display, mounted housing display, an external display, the ROI or other parts of the subject. Any accessible information (e.g., obtained, determined, or calculated, derived by the method) can be displayed in any suitable manner and in any suitable combination. In some cases, the information to be displayed can be selectively controlled through an interface. In some implementations, the information (e.g., concentration or index values) is displayed overlaying the visual image of the ROI.

For instance, as a non-limiting example, the first, second or third concentration values of a particular spectral signature can be displayed as a map or a contour on the ROI of the subject or on a display in electrical communication with the processor. Spatially-varying concentration values can be represented, for example, by different colors (e.g., pseudo colors) or by spatially-varying intensity of one or more colors. As another non-limiting example, index values (e.g., oxygenation index) derived from the first, second or third concentration values of one or more spectral signatures can also be displayed as a map or a contour on the ROI or a display. Spatially-varying concentration or index values can be represented, for example, by different colors or by spatially-varying intensity of one or more colors. As a further non-limiting example, the first and third concentration values of a particular spectral signature can be displayed, for example overlaying one on the other in different colors or side-by side, to show the difference between the presence of the particular spectral signature in different layers of the ROI. As a still further non-limiting example, one or more composite image datasets can be displayed on the ROI, overlaid on the contracted visual image of the ROI, or a display.

Diagnosing and Characterizing Information

Still referring to FIG. 2, at optional or additional step S216, the method provides medical and/or diagnosing information about the ROI. The characterization is generally based on one or more of: (i) the first concentration values of one or more spectral signatures in the first spectral signature set; (ii) the second concentration values of one or more spectral signatures in the second spectral signature set; (iii) the third concentration values of one or more spectral signatures in the third spectral signature set; (iv) index values derived from the first, second or third concentration values of one or more spectral signatures; and (v) one or more composite image datasets, each constructed by combining at least a subset of the first spectral image dataset with at least a subset of the second spectral image dataset, or by combining at least a subset of the first concentration values of one or more spectral signatures in the first spectral set and at least a subset of the third concentration values of one or more spectral signatures in the third spectral set. In some cases, the characterization also takes into consideration of other factors including but not limited to historical medical conditions of the subject and locations of the ROI.

Non-limiting examples of conditions that can be evaluated by the methods and the devices of the present invention include: tissue ischemia, ulcer formation, ulcer progression, pressure ulcer formation, pressure ulcer progression, diabetic foot ulcer formation, diabetic foot ulcer progression, venous stasis, venous ulcer disease, infection, shock, cardiac decompensation, respiratory insufficiency, hypovolemia, the progression of diabetes, congestive heart failure, sepsis, dehydration, hemorrhage, hypertension, exposure to a chemical, exposure to a biological agent, exposure to radiation (including but not limited to radiation therapy dosages), an inflammatory response, wound healing prediction, and wound formation prediction. Greater details on examples of conditions that can be evaluated by the method are provided elsewhere herein.

Other Methods

It should be noted that the spectral analysis disclosed in FIGS. 4 and 5 can be performed on any spectral image dataset. It does not necessarily require the presence of a second spectral image dataset or an ROI with a multilayer structure. For instance, it can be applied to analyze a single spectral image dataset (e.g., a single layer), or any one from a plurality of spectral image datasets (e.g., any layer of an ROI). Also, it does not necessarily require the spectral image dataset in a particular spectral range (e.g., the first or second spectral range). Further, it can be used separately or independently from one or more other steps disclosed herein.

Figure 7:
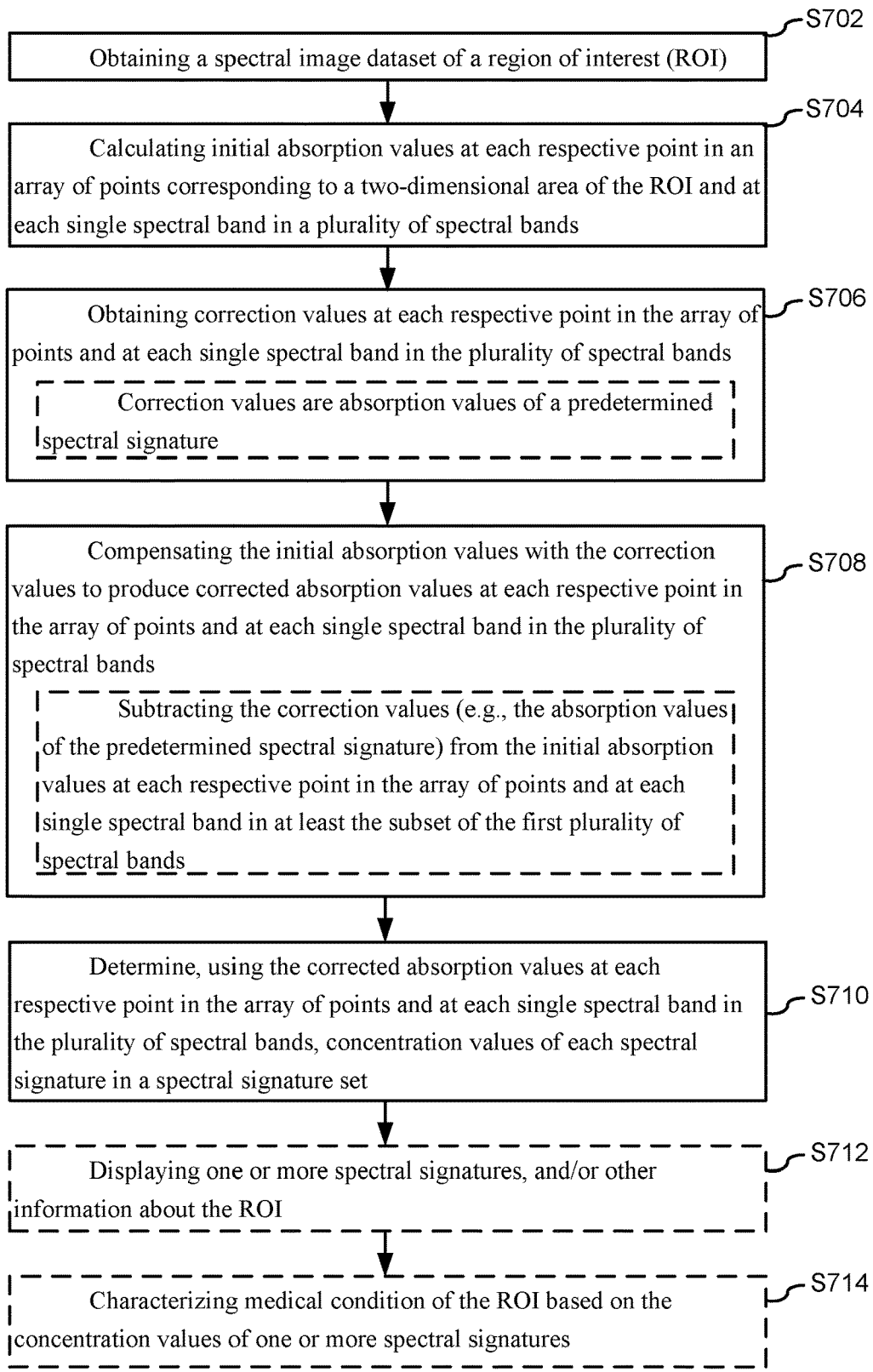
FIG. 7 is a flowchart illustrating another example method in accordance with an embodiment of the present disclosure.

As a non-limiting example, FIG. 7 illustrates a method 700 that performs a spectral analysis on a general spectral image dataset. At step S702, a spectral image dataset of the ROI is obtained. At step S704, initial absorption values are calculated at each respective point in an array of points corresponding to a two-dimensional area of the ROI and at each single spectral band in a plurality of spectral bands. At step S706, correction values (e.g., absorption values of a predetermined spectral signature) are obtained at each respective point in the array of points and at each single spectral band in the plurality of spectral bands. At step S708, the initial absorption values are compensated with the correction values to produce corrected absorption values at each respective point in the array of points and at each single spectral band in the plurality of spectral bands. For instance, the correction values (e.g., the absorption values of the predetermined spectral signature) are subtracted from the initial absorption values at each respective point in the array of points and at each single spectral band in at least the subset of the first plurality of spectral bands. At step S710, using the corrected absorption values at each respective point in the array of points and at each single spectral band in the plurality of spectral bands, concentration values of one or each spectral signature in a spectral signature set are determined. In some implementations, the method 700 also includes one or more additional, optional or alternative steps including but not limited to a displaying step S712 and a characterizing step S714.

The methods disclosed herein can be performed by a device with or without imaging capability. In many implementations, the methods disclosed herein are performed by a device of the present invention disclosed herein.

II. Hyperspectral/Multispectral Imaging Devices

Figure 8:
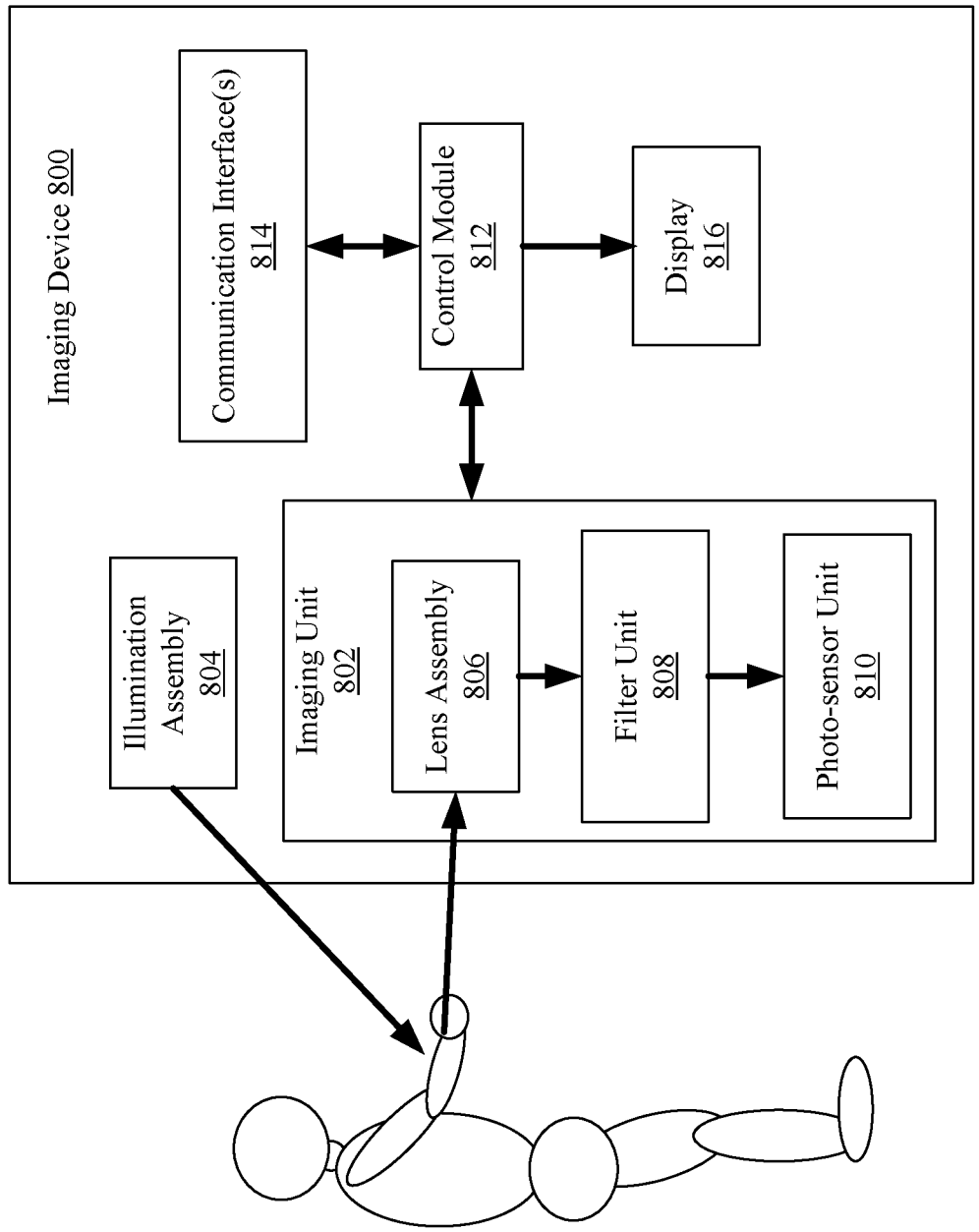
FIG. 8 is a schematic block diagram illustrating an example device in accordance with an embodiment of the present disclosure.

Turning now to FIG. 8, there is depicted a schematic diagram illustrating a hyperspectral/multispectral imaging device 800 in accordance with some embodiments of the present invention. The image device 800 generally includes an imaging unit 802 and a control module 812 in electrical communication with the imaging unit. The electrical communication can be local or remote, wired or wireless. In some implementations, the image device includes one or more additional or optional elements including but not limited to an illumination assembly 804, a communication interface(s) 814 and a display 816.

The imaging unit 802 is configured to receive light from an ROI of a subject and generate one or more spectral image datasets. In many implementations, the imaging unit is configured to generate a spectral image dataset that includes a first spectral image dataset and a second spectral image dataset. The first spectral image dataset comprises a first plurality of signal arrays. Each respective signal array in the first plurality of signal arrays is characterized by a single corresponding spectral band in a first plurality of spectral bands. Each spectral band in the first plurality of spectral bands is within a first spectral range. Similarly, the second spectral image dataset comprises a second plurality of signal arrays. Each respective signal array in the second plurality of signal arrays is characterized by a single corresponding spectral band in a second plurality of spectral bands. Each spectral band in the second plurality of spectral bands is within a second spectral range that is different than the first spectral range.

In some implementations, the imaging unit includes a lens assembly 806, a spectral filter unit 808 in optical communication with the lens assembly, and a photo-sensor unit 810 in optical communication with the spectral filter unit. The lens assembly can be a single lens or composed of multiple lens, and is configured to receive the light from an ROI of a subject.

The spectral filter unit 808 is characterized by the first and second pluralities of spectral bands and is used to filter the light. The spectral filter unit 808 can include one or more spectral filters. A spectral filter generally includes an array of filter elements (e.g., filter elements 211 disclosed herein). Filter elements can be described in terms of their spectral "bandpass," e.g., the span of component wavelengths allowed to pass through the filter. In some implementations, the bandpass of a filter element is defined as the span of component wavelengths at which the filter element is at least half as transparent as compared to the characteristic or center wavelength (FWHM). For example, the spectral bandpass of a filter element that is 100% transparent with respect to at least one component wavelength is the span of consecutive component wavelengths at which the filter element is at least 50% transparent. In certain implementations, the bandpass of a filter element can be equivalently expressed in terms of the component wavelengths (e.g., 450-480 nm) or as the width of the bandpass at the central wavelength (e.g., 30 nm at 465 nm or ±15 nm at 465 nm).

A bandpass filter of a filter element can also be described in terms of its "characteristic wavelength," e.g., the wavelength at which the filter is most transparent, or its "center wavelength," e.g., the component wavelength at the midpoint of the spectral bandpass. In certain implementations, the bandpass filter is characterized by both its characteristic or center wavelength and its spectral bandwidth. For example, a bandpass filter with a center wavelength of 340±2 nm, a FWHM bandwidth of 10±2, and a peak transmission (e.g., the maximum percentage transmission within the bandpass) of 50%, allows at least 25% of each component light having a wavelength from 330±4 nm to 350±4 nm to pass through.

In specific implementations, a filter element is a bandpass filter, e.g., a filter that allows only radiation having a wavelength in a certain range to pass, while blocking passage of other wavelengths. In certain embodiments, the FWHM spectral bandpass of a filter element 211 (e.g., the size of the bandpass transmitted through the filter) is no more than about 100 nm, preferably no more than about 50 nm, more preferably no more than about 25 nm. In yet other embodiments, the FWHM spectral bandwidth of a filter element 211 is no more than 250 nm, 200 nm, 200 nm, 175 nm, 150 nm, 150 nm, 125 nm, 100 nm, 90 nm, 80 nm, 75 nm, 70 nm, 65 nm, 60 nm, 55 nm, 50 nm, 45 nm, 40 nm, 35 nm, 30 nm, 25 nm, 20 nm, 15 nm, 10 nm, 9 nm, 8 nm, 7 nm, 6 nm, 5 nm, 4 nm, 3 nm, 2 nm, or 1 nm.

In certain implementations, the bandpass filter of a filter element is a narrow pass filter. In specific implementations, the narrow pass filter has a FWHM spectral bandwidth of no more than 25 nm, 24 nm, 23 nm, 22 nm, 21 nm, 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm, or 1 nm.

Figure 9:
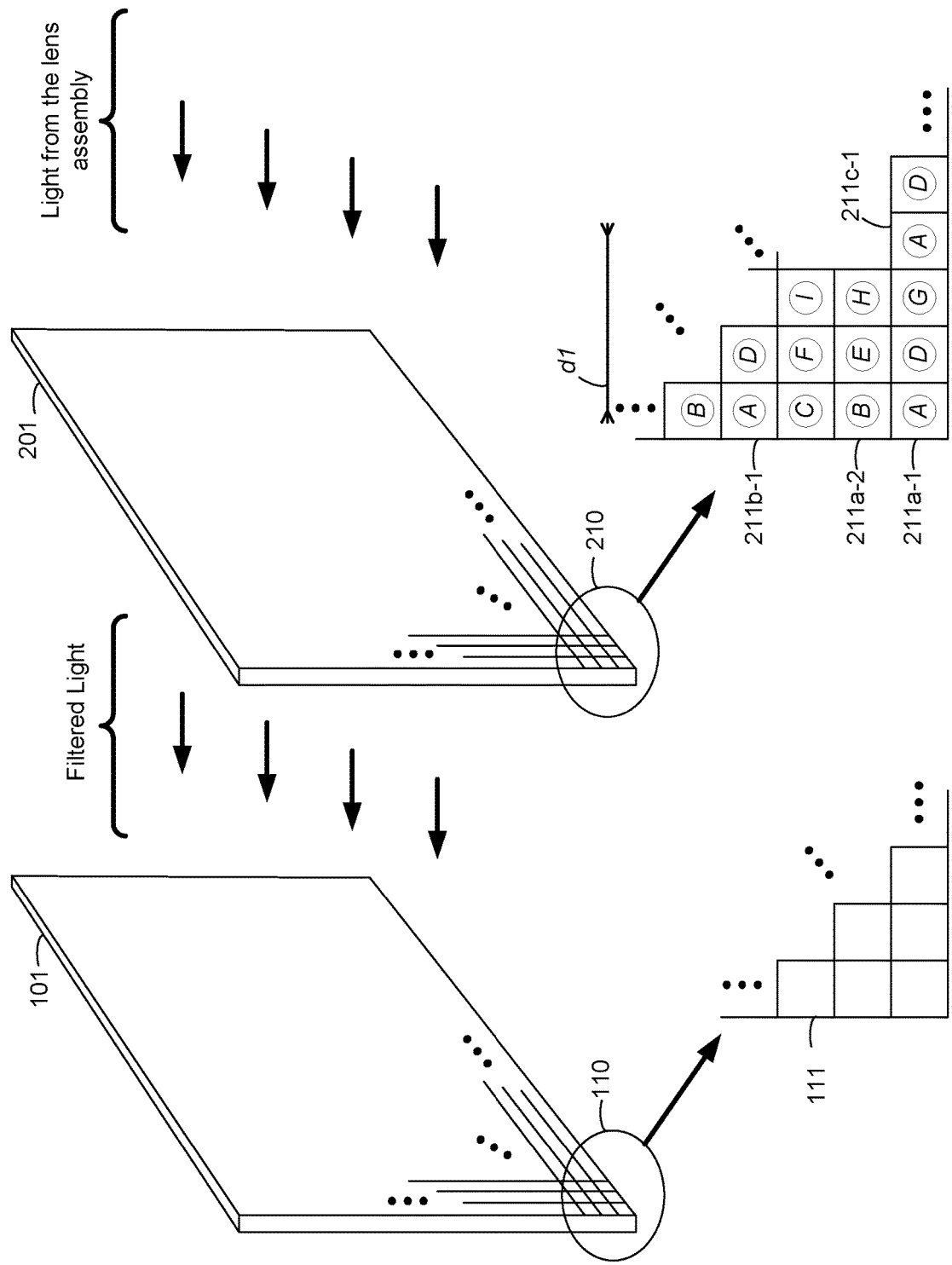
FIG. 9 is a schematic diagram illustrating a first example of an imaging unit in accordance with an embodiment of the present disclosure.

In some implementations, the filter elements, for instance those illustrated in FIG. 9, are a plurality of bandpass filters having central wavelengths that are separated by at least 10 nm, or at least 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, or more.

The photo-sensor unit 810 receives the filtered light and is configured to resolve the filtered light to the first spectral image dataset and the second spectral image dataset. The first spectral image dataset corresponds to the first plurality of spectral bands and the second spectral image dataset corresponds to the second plurality of spectral bands.

First Imaging Unit

Referring to FIG. 9, in some implementations, the spectral filter unit includes a filter or a filter array 201 to filter the light from the lens assembly. The photo-sensor unit includes a photo-sensor or a photo-sensor array 101 to receive and resolve the light filtered by the filter 201. As disclosed herein, the terms "filter" and "filter array" are used interchangeably, and the terms "photo-sensor" and "photo-sensor array" are used interchangeably. Configurations of the filter array 201 and/or the photo-sensor array 101 may be substantially the same or similar to those disclosed in WO 2014/063117, which is hereby incorporated by reference herein in its entirety.

In some implementations, the photo-sensor array 101 includes an array of photo-sensors 111. For example, detailed view 110 schematically shows, as a non-limiting example only, a number of photo-sensors 111 included in the photo-sensor array 101. Each photo-sensor 111 generates a respective electrical output by converting light incident on the photo-sensor.

In some implementations, the photo-sensor array 101 includes a CCD (charge coupled device) semiconductor sensor array. A CCD sensor is typically an analog device. When light strikes a CCD sensor array, the light is converted to and stored as an electrical charge by each photo-sensor. The charges are converted to voltage, on a photo-sensor by photo-sensor basis, as they are read from the CCD sensor array. Often, but not exclusively, one photo-senor is synonymous with a respective single pixel. However, in various implementations, a single pixel is configured to include two or more pixels.

In some implementations, the photo-sensor array 101 includes a CMOS (complementary metal oxide) semiconductor sensor array. A CMOS photo-sensor is an active photo-sensor that includes a photodetector and an active amplifier. In other words, each photo-sensor in a CMOS sensor array includes a respective photodetector and a corresponding active amplifier.

In some implementations, the photo-sensor array 101 includes a hybrid CCD/CMOS sensor array. In some implementations, a hybrid CCD/CMOS sensor array includes CMOS readout integrated circuits (ROICs) that are bump bonded to a CCD imaging substrate. In some implementations, a hybrid CCD/CMOS sensor array is produced by utilizing the fine dimensions available in modern CMOS technology to implement a CCD like structure in CMOS technology. This can be achieved by separating individual poly-silicon gates by a very small gap.

The light incident on a particular photo-sensor 111 is filtered by a respective filter in the filter array 201. In some implementations, the filter array 201 is configured to include an array of filter elements 211.

Each filter element is arranged to filter light received by a respective one or more of the array of photo-sensors in the photo-sensor array 101. Each filter element is also one of a plurality of filter-types, and each filter-type is characterized by a spectral pass-band different from the other filter-types. As such, the electrical output of a particular photo-sensor is associated with a particular spectral pass-band associated with the respective filter associated the particular photo-sensor 111.

For example, the detailed view 210 schematically shows, as a non-limiting example only, a number of filter-types A, B, C, D, E, F, G, H, and I are included in the filter array 201. In one implementation, at least two of filter types A, B, C, D, E, F, G, H, and I have different spectral pass-bands. For example, as illustrated in FIG. 9, filter elements 211a-1 and 211a-2 of filter types A and B, respectively, have different spectral pass-bands. In some implementations, at least two of filter types A, B, C, D, E, F, G, H, and I have the same spectral pass-band and at least two of filter types A, B, C, D, E, F, G, H, and I have different spectral pass-bands.

In some implementations, each filter-type A, B, C, D, E, F, G, H, and I has a spectral pass-band different from the others. In some implementations, the filter-types A, B, C, D, E, F, G, H, and I are arranged in a 3×3 grid that is repeated across the filter array 201. For example, as illustrated in FIG. 9, three filter elements 211a-1, 211b-1, 211c-1 of filter-type A are illustrated to show that instances of filter-type A are repeated in a uniform distribution across the filter array 201 such that the center-to-center distance dl between two filters of the same type is less than 250 microns in some implementations. In some implementations, the center-to-center distance dl between two filters of the same type is less than 100 microns.

Moreover, while nine filter-types are illustrated for example in FIG. 9, those skilled in the art will appreciate from the present disclosure that any number of filter types can be used in various implementations. For example, in some implementations 3, 5, 16 or 25 filter-types can be used in various implementations. Additionally and/or alternatively, while a uniform distribution of filter-types has been illustrated and described, those skilled in the art will appreciate from the present disclosure that, in various implementations, one or more filter-types may be distributed across a filter array in a non-uniform distribution. Additionally and/or alternatively, those skilled in the art will also appreciate that "white-light" or transparent filter elements may be included as one of the filter-types in a filter array.

In some implementations, each filter element in the array of filter elements is one of a first plurality of filter-types or one of a second plurality of filter-types. Each respective filter-type in the first plurality of filter types is characterized by a corresponding single spectral band that is characterized by (i) being one of the first plurality of spectral bands, (ii) being different from the other filter-types in the first plurality of filter types, and (iii) having a full width at half maximum of less than 20 nm. Each respective filter-type in the second plurality of filter types is characterized by a corresponding single spectral band that is characterized by (i) being one of the second plurality of spectral bands, (ii) being different from the other filter-types in the second plurality of filter types, and (iii) having a full width at half maximum of less than 20 nm. For instance, let the first plurality of filter types be represented by $\{A_1, A_2, \ldots, A_m\}$, where m can be 3, 4, 5, 16, 25 or other number. Let the second plurality of filter types be represented by $\{B_1, B_2, \ldots, B_n\}$, where n can be 3, 4, 5, 16, 25 or other number. Filter type $A_i$ (i=1, 2, \ldots, m) is characterized by a spectral band $\lambda_{Ai}$ (i=1, 2, \ldots, m). Each of $\lambda_{A1}, \lambda_{A2}, \ldots, \lambda_{Am}$ is in the first spectral range (e.g., the visible range) and is not equal to the other $\lambda_A$. Similarly, filter type $B_j$ (j=1, 2, \ldots, n) is characterized by a spectral band $\lambda_{Bj}$ (j=1, 2, \ldots, n). Each of $\lambda_{B1}, \lambda_{B2}, \ldots, \lambda_{Bn}$ is in the second spectral range (e.g., the infrared or near infrared range) and is not equal to the other $\lambda_B$.

In some implementations, filter elements of at least one particular filter-type in the first plurality of filter-types are spatially distributed across throughout the single spectral filter, and filter elements of at least one particular filter-type in the second plurality of filter-types are spatially distributed across throughout the single spectral filter. In an implementation, filter elements of each respective filter-type in the first plurality of filter-types are spatially distributed across throughout the single spectral filter. In an implementation, filter elements of each respective filter-type in the second plurality of filter-types are spatially distributed across throughout the single spectral filter.

The photo-sensor array 101 receives the filtered light and resolves it to an array of photo-sensor outputs. A first subset of the array of photo-sensor outputs is selected, for example, by the control module, to construct the first spectral image dataset, and a second subset of the array of photo-sensor outputs is selected to construct the second spectral image dataset. The selection is based on the association with the filter types. For instance, the first subset is selected such that all photo-sensor outputs in the first subset are associated with one or another filter type in the first plurality of filter types (e.g., $A_1, A_2, \ldots, A_m$). Similarly, the second subset is selected such that all photo-sensor outputs in the second subset are associated with one or another filter type in the second plurality of filter types (e.g., $B_1$, B2, \ldots, $B_n$).

While some example features are illustrated in FIG. 9, those skilled in the art will appreciate from the present disclosure that various other features have not been illustrated for the sake of brevity and so as not to obscure more pertinent aspects of the example implementations disclosed herein. For example, the various electrical connections and access control circuitry to receive the outputs of the photo-sensor array 101 have not been illustrated. Nevertheless, those skilled in the art will appreciate that at least one of various configurations of electrical connections and access control circuitry to receive the outputs of the photo-sensor array 101 would be included in an operable single-sensor hyperspectral imaging device. Moreover, a control module disclosed herein is configured to select, assemble, process, and analyze the outputs of the photo-sensor array 101 into a hyperspectral data cube.

Second Imaging Unit

Figure 10:
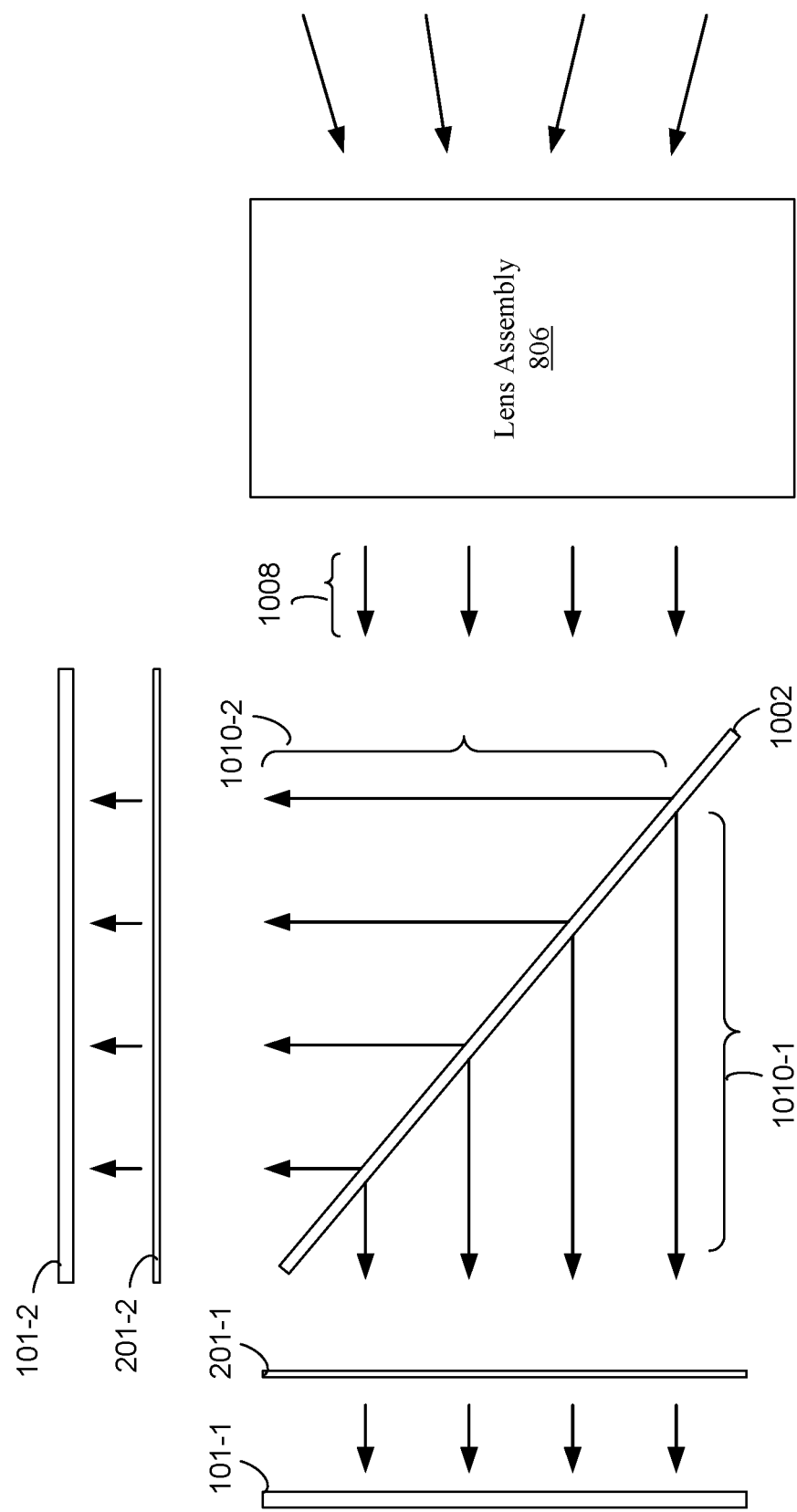
FIG. 10 is a schematic diagram illustrating a second example of an imaging unit in accordance with an embodiment of the present disclosure.

The photo-sensor unit 810 can include more than one photo-sensor and the filter unit 808 can include more than one filter. For instance, as a non-limiting example, FIG. 10 illustrates the photo-sensor unit 810 including a first photo-sensor 101-1 and a second photo-sensor 101-2, and the filter unit 808 including a first filter 201-1 and a second filter 201-2. In some implementations, the imaging unit 802 includes a dichroic optics 1002 in optical communication with the lens assembly 806 to split the light 1008 into a first light beam 1010-1 and a second light beam 1010-2. For instance, the dichroic optics 1002 can be configured to reflect one of the first and second light beams (either the first or the second light beam) and let the other of the first and second light beams to pass. Examples of a dichroic optics include but not limited to optical splitter(s), dichroic mirror(s), or other optics. By way of example, FIG. 10 illustrates a dichroic mirror that transmits the first light beam and reflects the second light beam.

The first light beam 1010-1, the second light beam 1010-2 or both of the first light beam 1010-1 and the second light beam 1010-2 can include light in both the first and second spectral ranges. Alternatively, each of the first light beam 1010-1 and the second light beam 1010-2 can be substantially limited to light in only one of the first and second spectral ranges. For instance, in an implementation, the first light beam 1010-1 includes light only in the first spectral range and the second light beam 1010-2 includes light only in the second spectral range.

The first spectral filter 201-1 is in optical communication with the dichroic optics to filter the first light beam. The second spectral filter 201-2 is in optical communication with the dichroic optics to filter the second light beam. The first spectral filter comprises a first array of filter elements and the second spectral filter comprises a second array of filter elements. The number of the first array of filter elements can be the same as or different from the number of the second array of filter elements. Each filter element in the first array of filter elements of the first spectral filter is one of a first plurality of filter-types or one of a second plurality of filter-types. Each filter element in the second array of filter elements of the second spectral filter is another one of the first plurality of filter-types or another one of the second plurality of filter-types that is different from the one of the first or second plurality of filter-types.

That is, the first or the second spectral filter or both can include filter elements in a filter type having a spectral band in the first spectral range (e.g., visible) and filter elements in a filter type having a spectral band in the second spectral range (e.g., infrared). For instance, as a non-limiting example, in an implementation, each filter element in the first array of filter elements of the first spectral filter is one of $\{A_1, A_2, B_1, B_2\}$, and each filter element in the second array of filter elements of the second spectral filter is one of $\{A_3, \ldots, A_m, B_3, \ldots, B_n\}$. As another non-limiting example, in an implementation, each filter element in the first array of filter elements of the first spectral filter is one of $\{A_1, A_2, \ldots, A_m, B_1, B_2\}$, and each filter element in the second array of filter elements of the second spectral filter is one of $\{B_3, B_n\}$.

In an implementation, each of the first and second spectral filter includes filter elements in filter types only in one spectral band. For instance, as a non-limiting example, in an implementation, each filter element in the first array of filter elements of the first spectral filter is one of $\{A_1, A_2, \ldots, A_m\}$, and each filter element in the second array of filter elements of the second spectral filter is one of $\{B_1, B_2, \ldots, B_n\}$.

The first photo-sensor 101-1 is in optical communication with the first spectral filter 201-1 to receive and resolve light filtered by the first spectral filter. The first photo-sensor comprises a first array of photo-sensor elements 111 that collectively generates a first array of photo-sensor outputs. The second photo-sensor 101-2 is in optical communication with the second spectral filter 202-2 to resolve light filtered by the second spectral filter. The second photo-sensor 101-2 comprises a second array of photo-sensor elements that collectively generates a second array of photo-sensor outputs.

The first spectral image dataset is constructed by selecting a first subset of the first array of photo-sensor outputs and a first subset of the second array of photo-sensor outputs generated by resolving light filtered by the first plurality of filter types. The second spectral image dataset is constructed by selecting a second subset of the first array of photo-sensor outputs and a second subset of the second array of photo-sensor outputs generated by resolving light filtered by the second plurality of filter types. For instance, in an implementation where each filter element in the first array of filter elements of the first spectral filter is one of $\{A_1, A_2, B_1, B_2\}$, and each filter element in the second array of filter elements of the second spectral filter is one of $\{A_3, \ldots, A_m, B_3, \ldots, B_n\}$, the first spectral image dataset can be constructed by selecting photo-sensor outputs from the first array of photo-sensor outputs that are associated with one or more of $\{A_1, A_2\}$ and by selecting photo-sensor outputs from the second array of photo-sensor outputs that are associated with one or more of $\{A_3, \ldots, A_m\}$. Similarly, the second spectral image dataset can be constructed by selecting photo-sensor outputs from the first array of photo-sensor outputs that are associated with one or more of $\{B_1, B_2\}$ and by selecting photo-sensor outputs from the second array of photo-sensor outputs that are associated with one or more of $\{B_3, \ldots, B_n\}$. In an implementation where each filter element in the first array of filter elements of the first spectral filter is one of $\{A_1, A_2, \ldots, A_m\}$ and each filter element in the second array of filter elements of the second spectral filter is one of $\{B_1, B_2, \ldots, B_n\}$, the first spectral image dataset is constructed without selection of photo-sensor outputs from the second array of photo-sensor outputs, and the second spectral dataset is constructed without selection of photo-sensor outputs from the first array of photo-sensor outputs.

While FIG. 10 illustrates the dichroic optics disposed after the lens unit, the dichroic optics can be disposed in other locations. For instance, in an alternative implementation, the dichroic optics is disposed before the lens unit, with the lens unit between the dichroic optics and the spectral filters. In such an implementation, the dichroic optics is configured to split light from the ROI into a first light beam and a second light beam. The lens unit is in optical communication with the dichroic optics and comprises a first lens and a second lens, wherein the first lens is configured to receive the first light beam and the second lens is configured to receive the second light beam. The first spectral filter is in optical communication with the first lens and the second spectral filter is in optical communication with the second lens of the lens assembly. In an implementation, an additional lens is used to direct light from the ROI to the dichroic optics.

Third Imaging Unit

Figure 11:
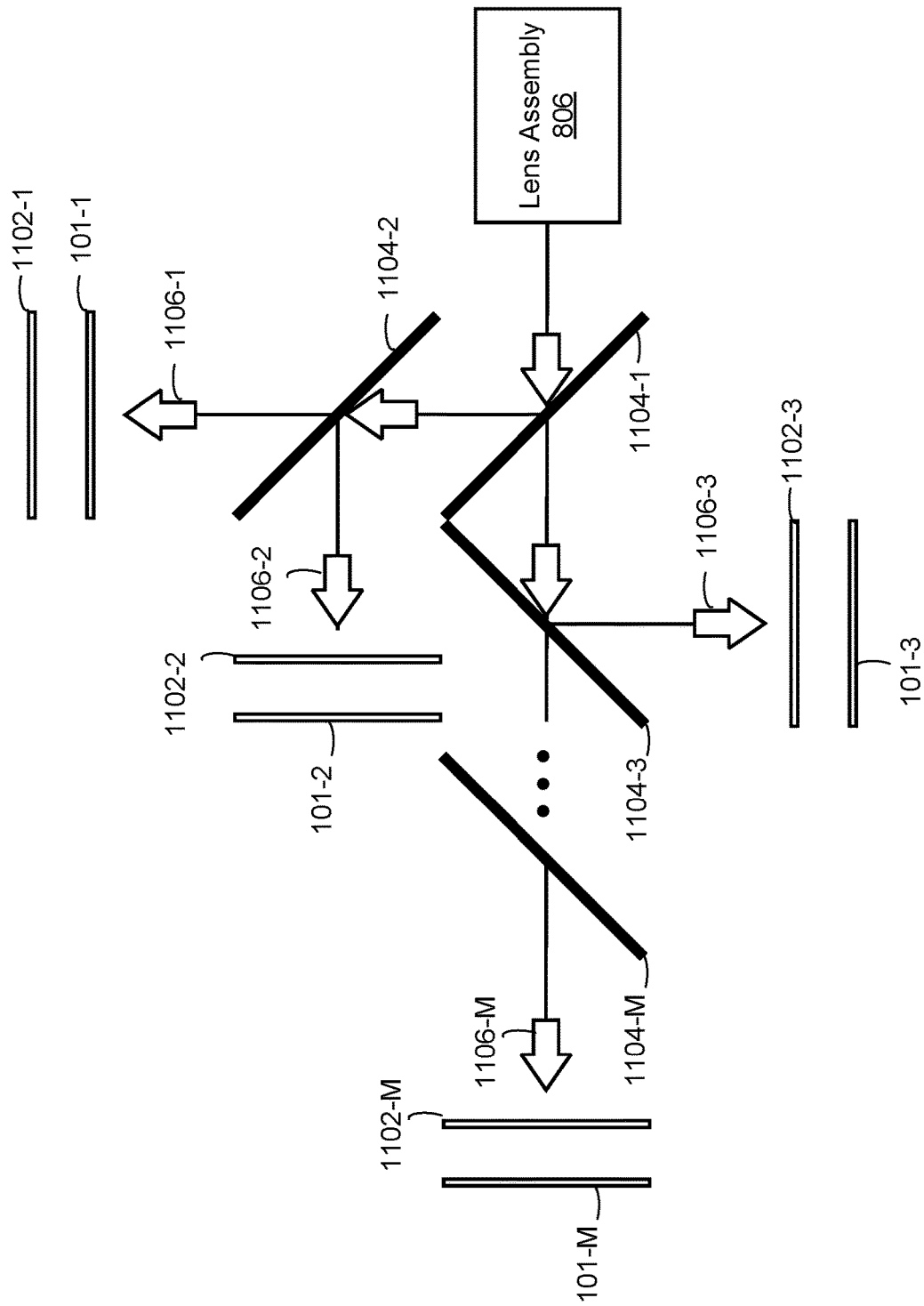
FIG. 11 is a schematic diagram illustrating a third example of an imaging unit in accordance with an embodiment of the present disclosure.

As another non-limiting example, FIG. 11 illustrates the imaging unit 802 having an optic splitter assembly that includes a plurality of optical splitters 1104-1, 1104-2, 1104-3, ..., 1104-M. The optic splitter assembly splits the light from the lens assembly into a plurality of light beams 1106-1, 1106-2, 1106-3, ..., and 1106-M. Examples of such an optic splitter assembly are disclosed in US 2016/0249810, which is hereby incorporated by reference herein in its entirety.

In some implementations, the filter unit 808 includes a plurality of spectral filters 1102-1, 1102-2, 1102-3, ..., 1102-M. Each spectral filter in the plurality of spectral filters can be a single bandpass filter, a dual bandpass filter or a multiple bandpass filter. As used herein, a single bandpass filter refers to a spectral filter that allows passage of one spectral band. The one spectral band can be in the first or second plurality of spectral bands. As used herein, a dual bandpass filter refers to a spectral filter that allows passage of two spectral bands. The two spectral bands can be in the first plurality of spectral bands, the second plurality of spectral bands, or one in the first plurality of spectral bands and the other in the second plurality of spectral bands. As used herein, a multiple bandpass filter generally refers to a spectral filter that allows passage of more than two spectral bands, such as those spectral filters 201 disclosed herein.

The plurality of spectral filters can be of the same type (e.g., signal, dual, or multiple) or different types. For instance, in an implementation, at least one spectral filter in the plurality of spectral filters is a dual bandpass filter such as those disclosed in US 2016/0249810, and at least one spectral filter in the plurality of spectral filters is a multiple-band pass filter as such the spectral filter 201 disclosed herein. In an implementation, each spectral filter in the plurality of spectral filters is a dual bandpass filter. In an implementation, each spectral filter in the plurality of spectral filters is a multiple-band pass filter. Each filter element in a respective spectral filter in the plurality of spectral filters 1102-1, 1102-2, 1102-3, ..., 1102-M is one of the first plurality of filter types (e.g., $A_1, A_2, \ldots, A_m$), or one of the second plurality of filter types (e.g., $B_1, B_2, \ldots, B_n$).

The photo-sensor unit 810 includes a plurality of photo-sensors 101-1, 101-2, 101-3, ..., 101-M. Each respective photo-sensor in the plurality of photo-sensors is covered by a corresponding spectral filter in the plurality of spectral filters. Each respective photo-sensor receives the light filtered by the corresponding spectral filter, and resolves it to an array of photo-sensor outputs.

The first spectral image dataset is constructed by selecting a first subset of the photo-sensor outputs from the plurality of photo-sensors, and the second spectral image dataset is constructed by selecting a second subset of the photo-sensor outputs from the plurality of photo-sensors. Like disclosed elsewhere herein, the selection is based on the association with the filter types. For instance, the first subset is selected such that all photo-sensor outputs in the first subset are associated with one or another filter type in the first plurality of filter types (e.g., $A_1, A_2, \ldots, A_m$). Similarly, the second subset is selected such that all photo-sensor outputs in the second subset are associated with one or another filter type in the second plurality of filter types (e.g., $B_1, B_2, \ldots, B_n$).

Additional, Optional, and/or Alternative Components

Figure 12:
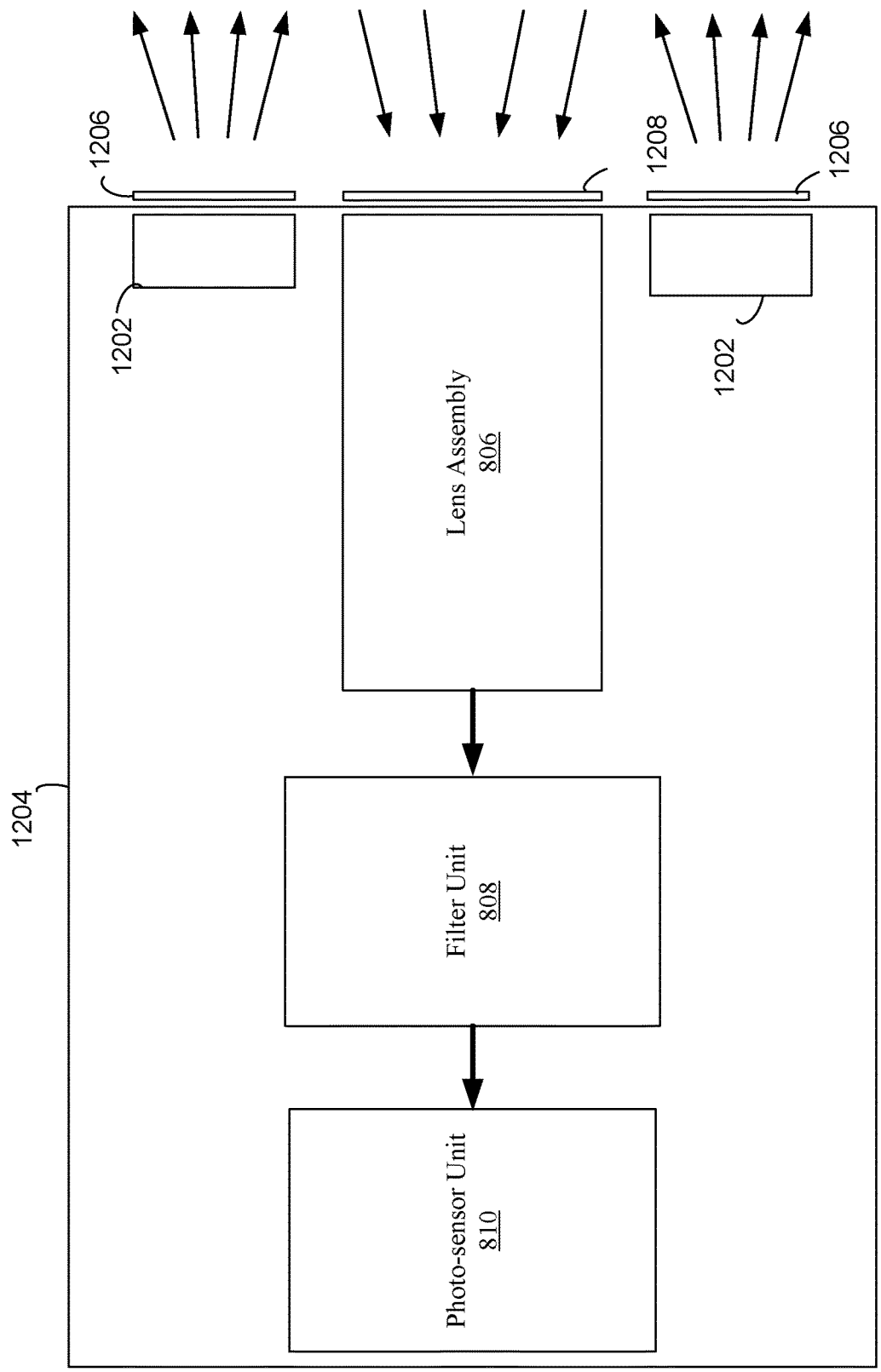
FIG. 12 is a schematic block diagram illustrating an example device with additional, optional, and/or alternative components in accordance with an embodiment of the present disclosure.

Referring to FIGS. 8 and 12, in some implementations, the imaging device 800 includes an illumination assembly 804 that generates light to illuminate an ROI of a subject. The light generated by the illumination assembly 804 can have a spectrum that includes a plurality of component wavelengths. The spectrum can include component wavelengths in the X-ray band (in the range of about 0.01 nm to about 10 nm); ultraviolet (UV) band (in the range of about 10 nm to about 400 nm); visible band (in the range of about 400 nm to about 700 nm); near infrared (NIR) band (in the range of about 700 nm to about 2500 nm); mid-wave infrared (MWIR) band (in the range of about 2500 nm to about 10 µm); long-wave infrared (LWIR) band (in the range of about 10 µm to about 100 µm); terahertz (THz) band (in the range of about 100 µm to about 1 mm); or millimeter-wave band (also referred to as the microwave band) in the range of about 1 mm to about 300 mm, among others. The NIR, MWIR, and LWIR are collectively referred to herein as the infrared (IR) band. The light can include a plurality of component wavelengths within one of the bands, e.g., a plurality of wavelengths in the NIR band, or in the THz. Alternately, the light can include one or more component wavelengths in one band, and one or more component wavelengths in a different band, e.g., some wavelengths in the visible, and some wavelengths in the IR. Light with wavelengths in both the visible and NIR bands is referred to herein as "VNIR." Other useful ranges may include the region 1,000-2,500 nm (shortwave infrared, or SWIR). Examples of illumination configurations are disclosed in WO 2014/063117, US 2013/0137961, US 2015/0271380, US 2016/0249810, US 2017/0067781, US 2017/0150903, and US 2017/0272666, each of which is hereby incorporated by reference herein in its entirety.

In some implementations, the illumination assembly 804 includes one or more light sources 1202. For example, the illumination assembly 804 can include a single broadband light source, a single narrowband light source, a plurality of narrowband light sources, or a combination of one or more broadband light source and one or more narrowband light source. By "broadband" it is meant light that includes component wavelengths over a substantial portion of at least one band, e.g., over at least 20%, or at least 30%, or at least 40%, or at least 50%, or at least 60%, or at least 70%, or at least 80%, or at least 90%, or at least 95% of the band, or even the entire band, and optionally includes component wavelengths within one or more other bands. A "white light source" is considered to be broadband, because it extends over a substantial portion of at least the visible band. By "narrowband" it is meant light that includes components over only a narrow spectral region, e.g., less than 20%, or less than 15%, or less than 10%, or less than 5%, or less than 2%, or less than 1%, or less than 0.5% of a single band. Narrowband light sources need not be confined to a single band, but can include wavelengths in multiple bands. A plurality of narrowband light sources may each individually generate light within only a small portion of a single band, but together may generate light that covers a substantial portion of one or more bands, e.g., may together constitute a broadband light source.

One example of a suitable light source is a diffused lighting source that uses a halogen lamp, such as the Lowel Pro-Light Focus Flood Light. A halogen lamp produces an intense broad-band white light which is a close replication of daylight spectrum. Other suitable light sources include a xenon lamp, a hydrargyrum medium-arc iodide lamp, and/or a light-emitting diode. In some embodiments, a light source is tunable. Other types of light sources are also suitable.

In an implementation, the illumination assembly comprises one or more incandescent lights, one or more xenon lamps, one or more halogen lamps, one or more hydrargyrum medium-arc iodide, and one or more broadband light emitting diodes (LEDs), or any combination thereof. In another implementation, the illumination assembly comprises a first light source emitting light that is substantially limited to the first spectral range and a second light source emitting light that is substantially limited to the second spectral range.

In some implementations, the illumination assembly comprises a plurality of light sources radially disposed on an exterior of a housing 1204 about the lens assembly. In an implementation, the illumination assembly comprises a plurality of light source sets radially disposed on the exterior of the housing about the lens assembly. Each light source set in the plurality of light source sets comprises a first light source that emits light that is substantially limited to the first spectral range and a second light source that emits light that is substantially limited to the second spectral range. Each light source in each light source set in the plurality of light source sets is offset from the lens assembly and positioned so that light from each respective light source is backscattered by the ROI of the subject and then passed through the lens assembly. Each light in each light source set has a different radial position with respect to the lens assembly. Examples of light source arrangement are disclosed in US 2016/0249810 and U.S. Pat. No. 9,526,427, each of which is hereby incorporated by reference herein in its entirety.

Depending on the particular light source used, the relative intensities of the light's component wavelengths are uniform (e.g., are substantially the same across the spectrum), or vary smoothly as a function of wavelength, or are irregular (e.g., in which some wavelengths have significantly higher intensities than slightly longer or shorter wavelengths), and/or can have gaps. Alternatively, the light can include one or more narrow-band spectra in regions of the electromagnetic spectrum that do not overlap with each other.

In some implementations, the illumination assembly 806 includes a lens to modify the focal properties of the light emitted from the one or more light sources 1202. In an implementation, the lens is selected such that an ROI of a subject can be substantially uniformly irradiated. That is, the intensity of light at one sub-region of the ROI is substantially the same as the intensity of light at another sub-region of the ROI. In another implementation, the intensity of the light varies from one sub-region to another.

In some implementations, the imaging device 800 includes one or more first polarizers 1206 disposed in front of the illumination assembly and configured to remove any light that does not have a selected polarization. The one or more polarizers 1206 can be, for example, a polarizing beam splitter or a thin film polarizer. The polarization can be selected, for example, by rotating the one or more polarizers 1206 appropriately.

In some implementations, the imaging device 800 further comprises one or more second polarizers 1208 configured to remove any light that does not have a selected polarization. The one or more polarizers 1208 can be, for example, a polarizing beam splitter or a thin film polarizer. The polarization can be selected, for example, by rotating the one or more polarizers 1208 appropriately.

In some implementations, the one or more first polarizer 1206 is configured to selectively allow light that is substantially limited to at least one first polarization to pass through; and the one or more second polarizer 1208 is configured to selectively allow light that is substantially limited to at least one second polarization to pass through. Each polarization in the at least one first polarization is in a different direction from the at least one second polarization, and each polarization in the at least one second polarization is in a different direction from the at least one first polarization. In an implementation, a polarization in the at least one first polarization is substantially perpendicular to a polarization in the at least second polarization.

Figure 13:
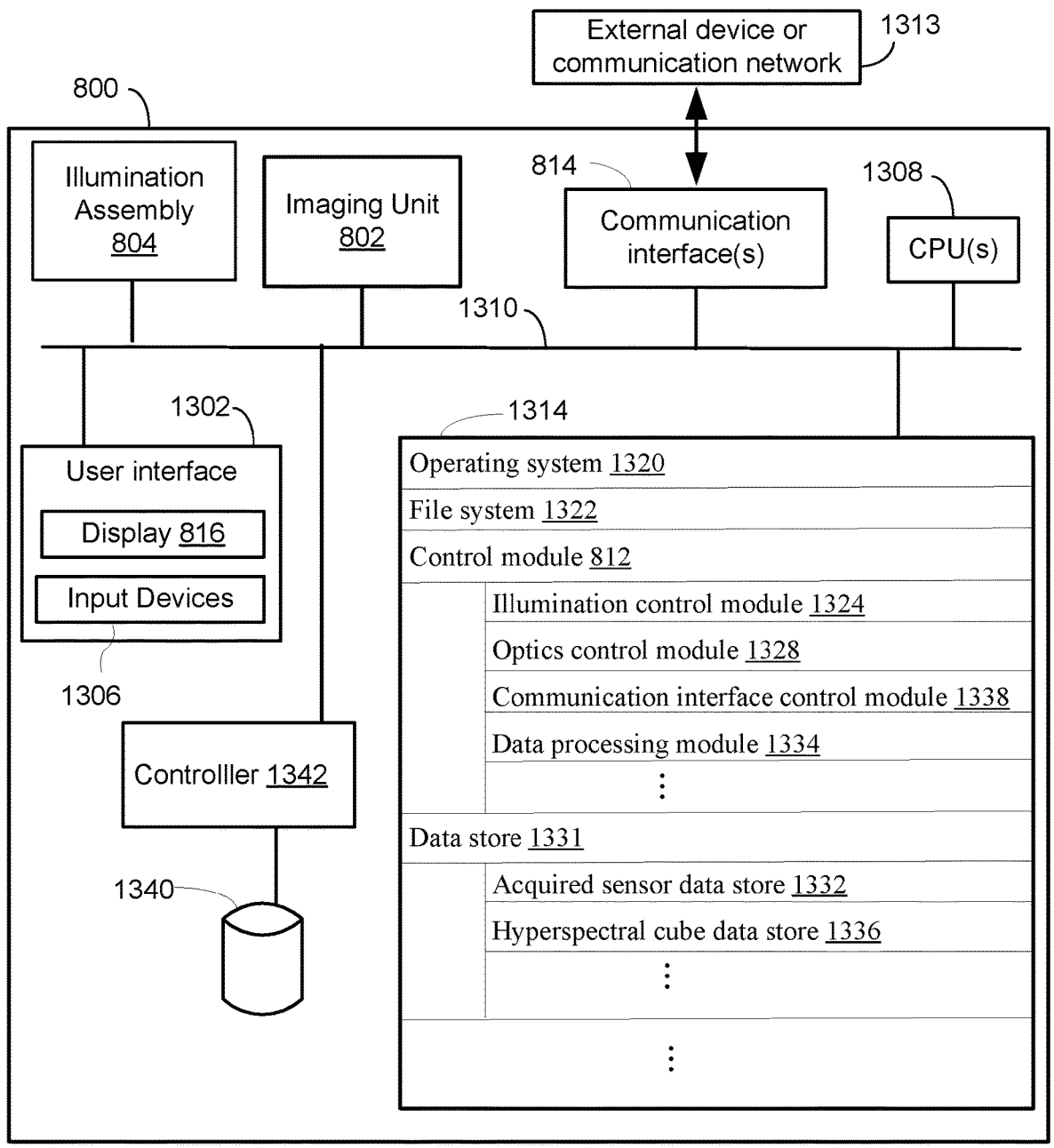
FIG. 13 is a schematic block diagram illustrating an example device with additional, optional, and/or alternative components in accordance with an embodiment of the present disclosure.

Referring to FIGS. 8 and 13, in some implementations, the imaging device 800 includes the imaging unit 802, the optional illumination assembly 804, one or more central processing units (CPU) 1308, an optional main non-volatile storage unit 1340, an optional controller 1342, a system memory 1314 for storing system control programs (e.g., control module 812), data, and application programs, including programs and data optionally loaded from the non-volatile storage unit 1340. In some implementations the non-volatile storage unit 1340 includes a memory card, for storing software and data. The storage unit 1340 is optionally controlled by the controller 1342.

The memory or the control module 812 is in electrical communication with the imaging unit 802. The electrical communication can be local or remote, with a wire or wireless. The control module 812 is configured to receive the first and second spectral image datasets of the ROI from the imaging unit, and perform a spectral analysis to determine spectral signature(s) of the ROI. In many implementations, the control module is configured to perform a first spectral analysis on the first spectral image dataset to determine first concentration values of one or each spectral signature in a first spectral signature set. The control module is also configured to perform a second spectral analysis on the second spectral image dataset to determine second concentration values of one or each spectral signature in a second spectral signature set. The first and second concentration values are determined at each respective point in an array of points corresponding to a two-dimensional area of the ROI. In some implementations, the control module is further configured to generate third concentration values of one or each spectral signature in a third spectral signature set at each respective point in the array of points. For instance, in some implementations, each of the first, second and third spectral signature sets comprises a first spectral signature (e.g., oxy-hemoglobin or deoxy-hemoglobin), the third concentration values of the first spectral signature are generated by compensating the second concentration values of the first spectral signature with the first concentration values of the first spectral signature at each respective point in the array of points.

In some implementations, the imaging device 800 optionally includes a user interface 1302 including one or more input devices 1306 (e.g., a touch screen, buttons, or switches) and/or an optional display 816. Additionally and/or alternatively, in some implementations, the imaging device 800 may be controlled by an external device such as a handheld device, a smartphone (or the like), a tablet computer, a laptop computer, a desktop computer, and/or a server system. To that end, the imaging device 800 includes one or more communication interfaces 814 for connecting to any wired or wireless external device or communication network (e.g. a wide area network such as the Internet) 1313. The imaging device 800 includes an internal bus 1310 for interconnecting the aforementioned elements. The communication bus 1310 may include circuitry (sometimes called a chipset) that interconnects and controls communications between the aforementioned components.

In some implementations, the imaging device 800 communicates with a communication network 1313, thereby enabling the imaging device 800 to transmit and/or receive data between mobile communication devices over the communication network, particularly one involving a wireless link, such as cellular, WiFi, ZigBee, BlueTooth, IEEE 802.11b, 802.11a, 802.11g, or 802.11n, etc. The communication network can be any suitable communication network configured to support data transmissions. Suitable communication networks include, but are not limited to, cellular networks, wide area networks (WANs), local area networks (LANs), the Internet, IEEE 802.11b, 802.11a, 802.11g, or 802.11n wireless networks, landline, cable line, fiber-optic line, etc. The imaging system, depending on an embodiment or desired functionality, can work completely offline by virtue of its own computing power, on a network by sending raw or partially processed data, or both concurrently.

The system memory 1314 includes high-speed random access memory, such as DRAM, SRAM, DDR RAM, or other random access solid state memory devices; and typically includes non-volatile memory flash memory devices, or other non-transitory solid state storage devices. The system memory 1314 optionally includes one or more storage devices remotely located from the CPU(s) 1308. The system memory 1314, or alternately the non-transitory memory device(s) within system memory 1314, comprises a non-transitory computer readable storage medium.

In some implementations, operation of the imaging device 800 is controlled primarily by an operating system 1320, which is executed by the CPU 1308. The operating system can be stored in the system memory 1314 and/or storage unit 1340. In some embodiments, the image device 800 is not controlled by an operating system, but rather by some other suitable combination of hardware, firmware and software.

In some implementations, the system memory 1314 includes one or more of a file system 1322 for controlling access to the various files and data structures described herein, an illumination software control module 1324 for controlling a light source associated and/or integrated with the imaging device 800, an optical control module 1328, a sensor data store 1331 for storing sensor data 1332 acquired by the imaging unit 802 and for storing hyperspectral data cube data 1336 assembled from the acquired sensor, a data processing software module 1334 for manipulating the acquired sensor data, and a communication interface software control module 1338 for controlling the communication interface 312 that connects to an external device (e.g., a handheld device, laptop computer, or desktop computer) and/or communication network (e.g. a wide area network such as the Internet).

In some implementations, the acquired sensor data 1332 is arranged and stored by the filter-type. The acquired sensor data 1332 and hyperspectral data cube data 1336 can be stored in the system memory 1314, and do not need to be concurrently present, depending on which stages of the analysis the imaging device 800 has performed at a given time. In some implementations, prior to imaging a subject and after communicating the acquired sensor data or processed data files thereof, the imaging device 800 contains neither acquired sensor data 1332 nor the hyperspectral data cube data 1336. In some implementations, after imaging a subject and after communicating the acquired sensor data or processed data files thereof, the imaging device 800 retains the acquired sensor data 1332 and/or hyperspectral data cube data 1336 for a period of time (e.g., until storage space is needed, for a predetermined amount of time, etc.).

In some implementations, the programs or software modules identified above correspond to sets of instructions for performing a function described above. The sets of instructions can be executed by one or more processors, e.g., a CPU(s) 1308. The above identified software modules or programs (e.g., sets of instructions) need not be implemented as separate software programs, procedures, or modules, and thus various subsets of these programs or modules may be combined or otherwise re-arranged in various embodiments. In some embodiments, the system memory 1314 stores a subset of the modules and data structures identified above. Furthermore, the system memory 1314 may store additional modules and data structures not described above.

The system memory 1314 optionally also includes one or more of the following software modules, which are not illustrated in FIG. 13: a spectral library which includes profiles for a plurality of medical conditions, a spectral analyzer software module to compare measured hyperspectral data to a spectral library, control modules for additional sensors, information acquired by one or more additional sensors, an image constructor software module for generating a hyperspectral image, a hyperspectral image assembled based on a hyperspectral data cube and optionally fused with information acquired by an additional sensor, a fusion software control module for integrating data acquired by an additional sensor into a hyperspectral data cube, and a display software control module for controlling a built-in display.

While examining a subject and/or viewing hyperspectral images of the subject, a physician can optionally provide input to the image device 800 that modifies one or more parameters upon which a hyperspectral image and/or diagnostic output is based. In some implementations, this input is provided using input device 1306. Among other things, the image device can be controlled to modify the spectral portion selected by a spectral analyzer (e.g., to modify a threshold of analytical sensitivity) or to modify the appearance of the image generated by an image assembler (e.g., to switch from an intensity map to a topological rendering).

In some implementations, the imaging device 800 can be instructed to communicate instructions to a subsystem to modify the sensing properties of one of the imaging unit 802 and the filter unit 808 (e.g., an exposure setting, a frame rate, an integration rate, or a wavelength to be detected). Other parameters can also be modified. For example, the imaging device 800 can be instructed to obtain a wide-view image of the subject for screening purposes, or to obtain a close-in image of a particular region of interest.

In some implementations, the imaging device 800 does not include a controller 1342 or a storage unit 1340. In some such implementations, the memory 1314 and CPU 1308 are one or more application-specific integrated circuit chips (ASICs) and/or programmable logic devices (e.g. an FGPA—Field Programmable Gate Array). For example, in some implementations, an ASIC and/or programmed FPGA includes the instructions of the illumination control module 1324, optical control module 1328, data processing module 1334 and/or communication interface control module 1338. In some implementations, the ASIC and/or FPGA further includes storage space for the data store 1331, the sensor data 1332 stored therein and/or the hyperspectral/multispectral data cubes 1336 stored therein.

In some implementations, the system memory 1314 includes a spectral library and spectral analyzer for comparing hyperspectral data generated by the image device 800 to known spectral patterns associated with various medical conditions. In some implementations, analysis of the acquired hyperspectral data is performed on an external device such as a handheld device, tablet computer, laptop computer, desktop computer, an external server, for example in a cloud computing environment.

In some implementations, a spectral library includes profiles for a plurality of medical conditions, each of which contain a set of spectral characteristics unique to the medical condition. A spectral analyzer uses the spectral characteristics to determine the probability that a region of the subject corresponding to a measured hyperspectral data cube is afflicted with the medical condition. In some implementations, each profile includes additional information about the condition, e.g., information about whether the condition is malignant or benign, options for treatment, etc. In some implementations, each profile includes biological information, e.g., information that is used to modify the detection conditions for subjects of different skin types. In some implementations, the spectral library is stored in a single database. In other implementations, such data is instead stored in a plurality of databases that may or may not all be hosted by the same computer, e.g., on two or more computers addressable by wide area network. In some implementations, the spectral library is electronically stored in the storage unit 1340 and recalled using the controller 1342 when needed during analysis of hyperspectral data cube data.

In some implementations, the spectral analyzer analyzes a particular spectra derived from hyperspectral data cube data, the spectra having pre-defined spectral ranges (e.g., spectral ranges specific for a particular medical condition), by comparing the spectral characteristics of a pre-determined medical condition to the subject's spectra within the defined spectral ranges. In some implementations, the pre-defined spectral ranges correspond to values of one or more of deoxyhemoglobin levels, oxyhemoglobin levels, total hemoglobin levels, oxygen saturation, oxygen perfusion, hydration levels, total hematocrit levels, melanin levels, and collagen levels of a tissue on a patient (e.g., an area 280*a* of the body of a subject 280). Performing such a comparison only within defined spectral ranges can both improve the accuracy of the characterization and reduce the computational power needed to perform such a characterization.

In some implementations, the medical condition is selected from the group consisting of tissue ischemia, ulcer formation, ulcer progression, pressure ulcer formation, pressure ulcer progression, diabetic foot ulcer formation, diabetic foot ulcer progression, venous stasis, venous ulcer disease, infection, shock, cardiac decompensation, respiratory insufficiency, hypovolemia, the progression of diabetes, congestive heart failure, sepsis, dehydration, hemorrhage, hypertension, exposure to a chemical, exposure to a biological agent, exposure to radiation (including but not limited to radiation therapy dosages), an inflammatory response, wound healing prediction, and wound formation prediction.

In some implementations, the spectral analyzer identifies a spectral signature within the hyperspectral data cube that corresponds with a medical condition of the patient. In certain implementations, this is accomplished by identifying a pattern of oxidation or hydration in a tissue associated with a tissue of the patient. In some implementations, the analysis of the hyperspectral data cube includes performing at least one of adjusting the brightness of at least one of the respective digital images in the hyperspectral data cube (e.g., image plane $310\_i$ at spectral band No. i, image plane $320\_j$ at spectral band No. j), adjusting the contrast of at least one of the respective digital images in the hyperspectral data cube, removing an artifact from at least one of the respective digital images in the hyperspectral data cube, processing one or more sub-pixels of at least one of the respective digital images in the hyperspectral data cube, and transforming a spectral hypercube assembled from a plurality of digital images.

In some implementations, the display 816 which receives an image (e.g., a color image, mono-wavelength image, or hyperspectral/multispectral image) from a display control module, and displays the image. Optionally, the display subsystem also displays a legend that contains additional information. For example, the legend can display information indicating the probability that a region has a particular medical condition, a category of the condition, a probable age of the condition, the boundary of the condition, information about treatment of the condition, information indicating possible new areas of interest for examination, and/or information indicating possible new information that could be useful to obtain a diagnosis, e.g., another test or another spectral area that could be analyzed.

In some implementations, a housing display is built into the housing of the imaging device 800. In an example of such an implementation, a video display in electronic communication with the processor 1308 is included. In some implementations, the housing display is a touchscreen display that is used to manipulate the displayed image and/or control the image device 800.

In some implementations, the communication interface 814 comprises a docking station for a mobile device having a mobile device display. A mobile device, such as a smart phone, a personal digital assistant (PDA), an enterprise digital assistant, a tablet computer, an IPOD, a digital camera, or a portable music player, can be connected to the docking station, effectively mounting the mobile device display onto the imaging device 800. Optionally, the mobile device is used to manipulate the displayed image and/or control the image device 800.

In some implementations, the imaging device 800 is configured to be in wired or wireless communication with an external display, for example, on a handheld device, tablet computer, laptop computer, desktop computer, television, IPOD, or projector unit, on which the image is displayed. Optionally, a user interface on the external device is used to manipulate the displayed image and/or control the imaging device 800.

In some implementations, an image can be displayed in real time on the display. The real-time image can be used, for example, to focus an image of the subject, to select an appropriate region of interest, and to zoom the image of the subject in or out. In one embodiment, the real-time image of the subject is a color image captured by an optical detector that is not covered by a detector filter. In some implementations, the imager subsystem comprises an optical detector dedicated to capturing true color images of a subject. In some implementations, the real-time image of the subject is a monowavelength, or narrow-band (e.g., 10-50 nm), image captured by an optical detector covered by a detector filter. In these embodiments, any optical detector covered by a detector filter in the imager subsystem may be used for: (i) resolving digital images of the subject for integration into a hyperspectral data cube; and (ii) resolving narrow-band images for focusing, or otherwise manipulating the optical properties of the imaging device 800.

In some implementations, a hyperspectral image constructed from data collected by the imaging unit is displayed on an internal housing display, mounted housing display, or external display. Assembled hyperspectral data (e.g., present in a hyperspectral/multispectral data cube) is used to create a two-dimensional representation of the imaged object or subject, based on one or more parameters. An image constructor module, stored in the imaging system memory or in an external device, constructs an image based on, for example, an analyzed spectrum. Specifically, the image constructor creates a representation of information within the spectra. In one example, the image constructor constructs a two-dimensional intensity map in which the spatially-varying intensity of one or more particular wavelengths (or wavelength ranges) within the spectra is represented by a corresponding spatially varying intensity of a visible marker.

In some implementations, the image constructor fuses a hyperspectral image with information obtained from one or more additional sensors. Non-limiting examples of suitable image fusion methods include: band overlay, high-pass filtering method, intensity hue-saturation, principle component analysis, and discrete wavelet transform.

The systems, methods and devices disclosed herein can be used to diagnose characterize a wide variety of medical conditions. They can be used locally or remotely. For instance, they can be used in distributed environments, clinic environments, and self/home diagnostic environments such as those disclosed in WO 2014/063117, which is hereby incorporated by reference herein in its entirety. The systems, methods and devices disclosed herein can provide more accurate and/or more thorough medical information about the ROI.

Non-limiting examples of conditions that can be evaluated by hyperspectral/multispectral imaging, include: tissue ischemia, ulcer formation, ulcer progression, pressure ulcer formation, pressure ulcer progression, diabetic foot ulcer formation, diabetic foot ulcer progression, venous stasis, venous ulcer disease, infection, shock, cardiac decompensation, respiratory insufficiency, hypovolemia, the progression of diabetes, congestive heart failure, sepsis, dehydration, hemorrhage, hypertension, exposure to a chemical, exposure to a biological agent, exposure to radiation (including but not limited to radiation therapy dosages), an inflammatory response, wound healing prediction, and wound formation prediction.

In one embodiment, the concentration of one or more skin or blood component is determined in order to evaluate a medical condition in a patient. Non-limiting examples of components useful for medical evaluation include: deoxyhemoglobin levels, oxyhemoglobin levels, total hemoglobin levels, oxygen saturation, oxygen perfusion, hydration levels, total hematocrit levels, melanin levels, collagen levels, and bilirubin levels. Likewise, the pattern, gradient, or change over time of a skin or blood component can be used to provide information on the medical condition of the patient.

In one embodiment, the systems, methods and devices described herein are used to evaluate tissue oximetry and correspondingly, medical conditions relating to patient health derived from oxygen measurements in the superficial vasculature. In certain embodiments, the systems, methods and devices described herein allow for the measurement of oxygenated hemoglobin, deoxygenated hemoglobin, oxygen saturation, and oxygen perfusion. Processing of these data provide information to assist a physician with, for example, diagnosis, prognosis, assignment of treatment, assignment of surgery, and the execution of surgery for conditions such as critical limb ischemia, diabetic foot ulcers, pressure ulcers, peripheral vascular disease, surgical tissue health, etc.

In one embodiment, the systems, methods and devices described herein are used to evaluate diabetic and pressure ulcers. Development of a diabetic foot ulcer is commonly a result of a break in the barrier between the dermis of the skin and the subcutaneous fat that cushions the foot during ambulation. This rupture can lead to increased pressure on the dermis, resulting in tissue ischemia and eventual death, and ultimately manifesting in the form of an ulcer (Frykberg R. G. et al., Diabetes Care 1998; 21(10):1714-9). Measurement of oxyhemoglobin, deoxyhemoglobin, and/or oxygen saturation levels by hyperspectral/multispectral imaging can provide medical information regarding, for example: a likelihood of ulcer formation at an ROI, diagnosis of an ulcer, identification of boundaries for an ulcer, progression or regression of ulcer formation, a prognosis for healing of an ulcer, the likelihood of amputation resulting from an ulcer. Further information on hyperspectral/multispectral methods for the detection and characterization of ulcers, e.g., diabetic foot ulcers, are found in U.S. Patent Application Publication No. 2007/0038042, and Nouvong A. et al., Diabetes Care. 2009 November; 32(11):2056-61, the contents of which are hereby incorporated herein by reference in their entireties for all purposes.

Other examples of medical conditions include, but are not limited to: tissue viability (e.g., whether tissue is dead or living, and/or whether it is predicted to remain living); tissue ischemia; malignant cells or tissues (e.g., delineating malignant from benign tumors, dysplasias, precancerous tissue, metastasis); tissue infection and/or inflammation; and/or the presence of pathogens (e.g., bacterial or viral counts). Some embodiments include differentiating different types of tissue from each other, for example, differentiating bone from flesh, skin, and/or vasculature. Some embodiments exclude the characterization of vasculature.

In yet other embodiments, the systems, methods and devices provided herein can be used during surgery, for example to determine surgical margins, evaluate the appropriateness of surgical margins before or after a resection, evaluate or monitor tissue viability in near-real time or real-time, or to assist in image-guided surgery. For more information on the use of hyperspectral/multispectral imaging during surgery, see, Holzer M. S. et al., J Urol. 2011 August; 186(2):400-4; Gibbs-Strauss S. L. et al., Mol Imaging. 2011 Apr. 10(2):91-101; and Panasyuk S. V. et al., Cancer Biol Ther. 2007 March; 6(3):439-46, the contents of which are hereby incorporated herein by reference in their entirety for all purposes.

For more information on the use of hyperspectral/multispectral imaging in medical assessments, see, for example: Chin J. A. et al., J Vasc Surg. 2011 December; 54(6):1679-88; Khaodhiar L. et al., Diabetes Care 2007; 30:903-910; Zuzak K. J. et al., Anal Chem. 2002 May 1; 74(9):2021-8; Uhr J. W. et al., Transl Res. 2012 May; 159(5):366-75; Chin M. S. et al., J Biomed Opt. 2012 February; 17(2):026010; Liu Z. et al., Sensors (Basel). 2012; 12(1):162-74; Zuzak K. J. et al., Anal Chem. 2011 Oct. 1; 83(19):7424-30; Palmer G. M. et al., J Biomed Opt. 2010 Nov.-Dec. 15(6):066021; Jafari-Saraf and Gordon, Ann Vasc Surg. 2010 August; 24(6):741-6; Akbari H. et al., IEEE Trans Biomed Eng. 2010 August; 57(8):2011-7; Akbari H. et al., Conf Proc IEEE Eng Med Biol Soc. 2009:1461-4; Akbari H. et al., Conf Proc IEEE Eng Med Biol Soc. 2008:1238-41; Chang S. K. et al., Clin Cancer Res. 2008 Jul. 1; 14(13):4146-53; Siddiqi A. M. et al., Cancer. 2008 Feb. 25; 114(1):13-21; Liu Z. et al., Appl Opt. 2007 Dec. 1; 46(34):8328-34; Zhi L. et al., Comput Med Imaging Graph. 2007 December; 31(8):672-8; Khaodhiar L. et al., Diabetes Care. 2007 April; 30(4):903-10; Ferris D. G. et al., J Low Genit Tract Dis. 2001 April; 5(2):65-72; Greenman R. L. et al., Lancet. 2005 Nov. 12; 366(9498):1711-7; Sorg B. S. et al., J Biomed Opt. 2005 Jul.-Aug. 10(4):44004; Gillies R. et al., and Diabetes Technol Ther. 2003; 5(5):847-55, the contents of which are hereby incorporated herein by reference in their entirety for all purposes.

In yet other embodiments, the systems, methods and devices provided herein can be used during surgery, for example to determine surgical margins, evaluate the appropriateness of surgical margins before or after a resection, evaluate or monitor tissue viability in near-real time or real-time, or to assist in image-guided surgery. For more information on the use of hyperspectral/multispectral imaging during surgery, see, Holzer M. S. et al., J Urol. 2011 August; 186(2):400-4; Gibbs-Strauss S. L. et al., Mol Imaging. 2011 Apr. 10(2):91-101; and Panasyuk S. V. et al., Cancer Biol Ther. 2007 March; 6(3):439-46, the contents of which are hereby incorporated herein by reference in their entirety for all purposes.

Hyperspectral and multispectral imaging are related techniques in larger class of spectroscopy commonly referred to as spectral imaging or spectral analysis. Typically, hyperspectral imaging relates to the acquisition of a plurality of images, each image representing a narrow spectral band collected over a continuous spectral range, for example, 5 or more (e.g., 5, 10, 15, 20, 25, 30, 40, 50, or more) spectral bands having a FWHM bandwidth of 1 nm or more each (e.g., 1 nm, 2 nm, 3 nm, 4 nm, 5 nm, 10 nm, 20 nm or more), covering a contiguous spectral range (e.g., from 400 nm to 800 nm). In contrast, multispectral imaging relates to the acquisition of a plurality of images, each image representing a narrow spectral band collected over a discontinuous spectral range.

For the purposes of the present disclosure, the terms "hyperspectral" and "multispectral" are used interchangeably and refer to a plurality of images, each image representing a narrow spectral band (having a FWHM bandwidth of between 10 nm and 30 nm, between 5 nm and 15 nm, between 5 nm and 50 nm, less than 100 nm, between 1 and 100 nm, etc.), whether collected over a continuous or discontinuous spectral range.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms "first," "second," etc. may be used herein to describe various elements, these elements should not be limited by these terms. These terms are only used to distinguish one element from another. For example, a first spectral range could be termed a second spectral range, and, similarly, a second spectral range could be termed a first spectral range, which changing the meaning of the description, so long as all occurrences of the first spectral range are renamed consistently and all occurrences of the second spectral range are renamed consistently. The first spectral range and the second spectral range are both spectral ranges, but they are not the same spectral range.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An imaging method for providing medical information of a region of interest (ROI) of a subject, wherein the imaging method is performed by a device comprising a processor and memory, the imaging method comprising:
    obtaining a first spectral image dataset of the ROI, wherein the first spectral image dataset comprises a first plurality of signal arrays, and each respective signal array in the first plurality of signal arrays is characterized by a single corresponding spectral band in a first plurality of spectral bands, wherein each spectral band in the first plurality of spectral bands is within a first spectral range that penetrates tissue with a first average depth;
    obtaining a second spectral image dataset of the ROI, wherein the second spectral image dataset comprises a second plurality of signal arrays, and each respective signal array in the second plurality of signal arrays is characterized by a single corresponding spectral band in a second plurality of spectral bands, wherein each spectral band in the second plurality of spectral bands is within a second spectral range that is different than the first spectral range that penetrates tissue with a second average depth, wherein the second average depth is deeper than the first average depth;
    performing a first spectral analysis on the first spectral image dataset to determine first concentration values of each spectral signature in a first spectral signature set at each respective point in an array of points corresponding to a two-dimensional area of the ROI, wherein the first spectral signature set comprises a first spectral signature;
    performing a second spectral analysis on the second spectral image dataset to determine second concentration values of each spectral signature in a second spectral signature set at each respective point in the array of points, wherein the second spectral signature set comprises the first spectral signature; and
    generating third concentration values of each spectral signature in a third spectral signature set at each respective point in the array of points, wherein the third spectral signature set comprises the first spectral signature, wherein the third concentration values of the first spectral signature are generated by compensating the second concentration values of the first spectral signature with the first concentration values of the first spectral signature at each respective point in the array of points.

2. The method of claim 1, wherein the third concentration values of the first spectral signature are generated by subtracting the first concentration values of the first spectral signature from the second concentration values of the first spectral signature at each respective point in the array of points.

3. The method of claim 1, wherein the first spectral signature is one of oxyhemoglobin and deoxyhemoglobin.

4. The method of claim 1, wherein each of the first, second and third signature sets comprises a second spectral signature, wherein the third concentration values of the second spectral signature at each respective point in the array of points are generated by compensating the second concentration values of the second spectral signature with the first concentration values of the second spectral signature at each respective point in the array of points.

5. The method of claim 4, wherein the third concentration values of the second spectral signature are generated by subtracting the first concentration values of the second spectral signature from the second concentration values of the second spectral signature at each respective point in the array of points.

6. The method of claim 4, wherein the first spectral signature is one of oxyhemoglobin and deoxyhemoglobin, and the second spectral signature is the other of oxyhemoglobin and deoxyhemoglobin.

7. The method of claim 1, wherein the second spectral signature set further comprises a third spectral signature.

8. The method of claim 7, wherein the third spectral signature is water present in the ROI.

9. The method of claim 1, wherein at least one of the first, second and third spectral signature sets further comprises a fourth spectral signature.

10. The method of claim 9, wherein the fourth spectral signature is melanin present in the ROI.

11. The method of claim 1, wherein the performing of the first spectral analysis on the first spectral image dataset comprises:
    determining, using the first spectral image dataset, first absorption values at each respective point in the array of points and at each single spectral band in at least a subset of the first plurality of spectral bands, wherein the first concentration values of each spectral signature in the first spectral signature set at each respective point in the array of points are determined based on the first absorption values, wherein the determining of the first absorption values comprises:
    determining, using the first spectral image dataset, first initial absorption values at each respective point in the array of points and at each single spectral band in at least the subset of the first plurality of spectral bands;

obtaining correction values at each respective point in the array of points and at each single spectral band in at least the subset of the first plurality of spectral bands; and generating the first absorption values by compensating the first initial absorption values with the correction values at each respective point in the array of points and at each single spectral band in at least the subset of the first plurality of spectral bands, wherein the correction values are absorption values of a predetermined spectral signature and the generating of the first absorption values is performed by subtracting the absorption values of the predetermined spectral signature from the first initial absorption values at each respective point in the array of points and at each single spectral band in at least the subset of the first plurality of spectral bands.

12. The method of claim 11, wherein the correction values comprise absorption values of melanin present in the ROI.

13. The method of claim 11, wherein the correction values comprise absorption values of water present in the ROI.

14. The method of claim 1, further comprising:
capturing a first spectral image of the ROI to provide the first spectral image dataset of the ROI; and
capturing a second spectral image of the ROI to provide the second spectral image dataset of the ROI.

15. The method of claim 14, wherein the device further comprises a first photo-sensor and a second photo-sensor configured to resolve light, wherein the method further comprising:
exposing the first photo-sensor to a first light beam to generate the first plurality of signal arrays, wherein the first light beam is substantially limited to the first plurality of spectral bands and
exposing the second photo-sensor to a second light beam to generate the second plurality of signal arrays, wherein the second light beam is substantially limited to the second plurality of spectral bands.

16. The method of claim 1, wherein the first spectral range has a spectral range between 450 nm and 700 nm, and the second spectral range has a spectral range between 700 nm and 1300 nm.

17. The method of claim 16, wherein the second spectral range has a spectral range between 700 nm and 1000 nm.

18. The method of claim 1, wherein the first plurality of spectral bands comprises spectral bands having central wavelengths of: 520±3 nm, 540±3 nm, 560±3 nm, 580±3 nm, 590±3 nm, 610±3 nm, 620±3 nm, and 660±3 nm, wherein each spectral band in the first plurality of spectral bands has a full width at half maximum of less than 20 nm, less than 15 nm, or less than 10 nm.

19. The method of claim 1, wherein the second plurality of spectral bands comprises spectral bands having central wavelengths of: 740±3 nm, 760±3 nm, 830±3 nm, 835±3 nm, 850±3 nm, 860±3 nm, 880±3 nm, and 940±3 nm, wherein each spectral band in the second plurality of spectral bands has a full width at half maximum of less than 20 nm, less than 15 nm, or less than 10 nm.

20. The method of claim 19, wherein the second plurality of spectral bands further comprises a spectral band having a central wavelength of 830±3 nm or 835±3 nm with a full width at half maximum of less than 20 nm, less than 15 nm, or less than 10 nm.

* * * * *